US008441197B2

(12) United States Patent
Taipale et al.

(10) Patent No.: US 8,441,197 B2
(45) Date of Patent: May 14, 2013

(54) METHOD OF STRIKING A LAMP IN AN ELECTRONIC DIMMING BALLAST CIRCUIT

(75) Inventors: Mark S. Taipale, Harleysville, PA (US); Aaron Dobbins, Hopedale, MA (US); Mehmet Ozbek, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 219 days.

(21) Appl. No.: 13/079,288

(22) Filed: Apr. 4, 2011

(65) Prior Publication Data

US 2011/0266959 A1     Nov. 3, 2011

Related U.S. Application Data

(60) Provisional application No. 61/321,289, filed on Apr. 6, 2010.

(51) Int. Cl.
*H05B 37/02* (2006.01)
*H05B 39/04* (2006.01)
*H05B 41/36* (2006.01)

(52) U.S. Cl.
USPC .. 315/209 R; 315/291; 315/307; 315/DIG. 5; 315/DIG. 7

(58) Field of Classification Search ............... 315/209 R, 315/223–226, 291, 302, 307–308, DIG. 2, 315/DIG. 5, DIG. 7
See application file for complete search history.

(56) References Cited

U.S. PATENT DOCUMENTS

| 5,502,423 | A | 3/1996 | Okude et al. |
| 5,945,788 | A | 8/1999 | Li et al. |
| 6,225,754 | B1 * | 5/2001 | Horiuchi et al. ............... 315/246 |
| 6,452,344 | B1 | 9/2002 | MacAdam et al. |
| 6,642,669 | B1 | 11/2003 | MacAdam et al. |
| 7,312,582 | B2 | 12/2007 | Newman, Jr. et al. |
| 7,489,090 | B2 | 2/2009 | Taipale |
| 7,619,539 | B2 | 11/2009 | Veskovic et al. |
| 7,843,139 | B2 | 11/2010 | Gawrys et al. |

(Continued)

FOREIGN PATENT DOCUMENTS

| DE | 102004037389 A1 | 3/2006 |
| EP | 0766499 A1 | 4/1997 |
| JP | 2002 352991 A | 12/2002 |

OTHER PUBLICATIONS

European Patent Office, International Search Report and Written Opinion for International Patent Application No. PCT/US2011/031172, Jan. 3, 2012, 13 pages.

*Primary Examiner* — Anh Tran
(74) *Attorney, Agent, or Firm* — Mark E. Rose; Philip N. Smith; Bridget L. McDonough

(57) ABSTRACT

A method of striking a gas discharge lamp involves the steps of generating a high-frequency square-wave voltage having an operating frequency, generating a sinusoidal voltage from the high-frequency square-wave voltage, controlling the operating frequency to a low-end frequency, and increasing the amplitude of the sinusoidal voltage during successive pulse times and then decreasing the amplitude of the sinusoidal voltage towards the low-end amplitude at the end of each of the successive pulse times until the lamp has struck, where the length of each of the successive pulse times being greater than the length of the previous pulse time. A maximum amplitude of the sinusoidal voltage during each pulse time may be greater than a maximum amplitude of the sinusoidal voltage during the previous pulse time.

30 Claims, 14 Drawing Sheets

U.S. PATENT DOCUMENTS

| | | |
|---|---|---|
| 2003/0006720 A1 | 1/2003 | Borella et al. |
| 2003/0111969 A1* | 6/2003 | Konishi et al. ............ 315/291 |
| 2003/0151378 A1 | 8/2003 | Busse et al. |
| 2010/0060179 A1 | 3/2010 | Newman, Jr. et al. |
| 2010/0060187 A1 | 3/2010 | Newman, Jr. et al. |
| 2010/0060200 A1 | 3/2010 | Newman, Jr. et al. |
| 2010/0066260 A1 | 3/2010 | Newman, Jr. et al. |
| 2010/0141158 A1 | 6/2010 | Newman, Jr. et al. |

* cited by examiner

METHOD OF STRIKING A LAMP IN AN ELECTRONIC DIMMING BALLAST CIRCUIT

CROSS-REFERENCE TO RELATED APPLICATIONS

This application is a non-provisional application of commonly-assigned U.S. Provisional Application Ser. No. 61/321,289, filed Apr. 6, 2010, entitled METHOD OF STRIKING A LAMP IN AN ELECTRONIC DIMMING BALLAST, the entire disclosure of which is hereby incorporated by reference.

BACKGROUND OF THE INVENTION

1. Field of the Invention

The present invention relates to electronic ballasts for controlling a gas discharge lamp, such as a fluorescent lamp, and more specifically, to a method of striking the gas discharge lamp.

2. Description of the Related Art

In order to reduce energy consumption of artificial illumination sources, the use of high-efficiency light sources is increasing, while the use of low-efficiency light sources (i.e., incandescent lamps, halogen lamps, and other low-efficacy light sources) is decreasing. High-efficiency light sources may comprise, for example, gas discharge lamps (such as compact fluorescent lamps), phosphor-based lamps, high-intensity discharge (HID) lamps, light-emitting diode (LED) light sources, and other types of high-efficacy light sources. Since incandescent lamps (including halogen lamps) generate a continuous spectrum of light, objects illuminated by incandescent lamps appear as they would in sunlight, thus providing more pleasing and accurate color rendering information to the human eye. Unfortunately, continuous-spectrum light sources, such as incandescent and halogen lamps, tend to be very inefficient.

In contrast, a much greater percentage of the radiant energy of fluorescent lamps is produced inside the visible spectrum than the radiant energy produced by incandescent lamps. However, a typical high-efficiency light source does not typically provide a continuous spectrum of light output, but rather provides a discrete spectrum of light output. Most of the light produced by a discrete-spectrum light source is concentrated primarily around one or more discrete wavelengths. Objects viewed under a discrete-spectrum light source may not exhibit the full range of colors that would be seen if viewed under a continuous-spectrum light source.

Lighting control devices, such as dimmer switches, allow for the control of the amount of power delivered from a power source to a lighting load, such that the intensity of the lighting load may be dimmed. Both high-efficiency and low-efficiency light sources can be dimmed, but the dimming characteristics of these two types of light sources typically differ. A low-efficiency light source can usually be dimmed to very low light output levels, typically below 1% of the maximum light output. However, a high-efficiency light source cannot be typically dimmed to very low output levels. Low-efficiency light sources and high-efficiency light sources typically provide different correlated color temperatures and color rendering indexes as the light sources are dimmed. The color of the light output of a low-efficiency light source (such as an incandescent lamp or a halogen lamp) typically shifts more towards the red portion of the color spectrum when the low-efficiency light source is dimmed to a low light intensity. In contrast, the color of the light output of a high-efficiency light source (such as a compact fluorescent lamp or an LED light source) is normally relatively constant through its dimming range with a slightly blue color shift and thus tends to be perceived as a cooler effect to the eye.

Generally, people have grown accustomed to the dimming performance and operation of low-efficiency light sources. As more people begin using high-efficiency light sources—typically to save energy—they are somewhat dissatisfied with the overall performance of the high-efficiency light sources. Thus, there has been a long-felt need for a light source that combines the advantages, while minimizing the disadvantages, of both low-efficiency (i.e., continuous-spectrum) and high-efficiency (i.e., discrete-spectrum) light sources. It would be desirable to provide a hybrid light source that includes a high-efficiency lamp for saving energy when the light source is controlled to a high light intensity and a low-efficiency lamp for providing a pleasing color when the light source is controlling to a low light intensity. Thus, there is a need for a method of controlling both lamps of such a hybrid light source in order to provide a continuous total light intensity and a pleasing light color across the dimming range.

SUMMARY OF THE INVENTION

According to an embodiment of the present invention, a method of striking a gas discharge lamp comprises the steps of: (1) generating a high-frequency square-wave voltage having an operating frequency; (2) generating a sinusoidal voltage from the high-frequency square-wave voltage; (3) coupling the sinusoidal voltage to the lamp; (4) controlling the amplitude of the sinusoidal voltage to a low-end amplitude; and (5) periodically increasing the amplitude of the sinusoidal voltage during successive pulse times and then decreasing the amplitude of the sinusoidal voltage towards the low-end amplitude at the end of each of the successive pulse times until the lamp has struck, where the length of each of the successive pulse times is greater than the length of the previous pulse time. Further, a maximum amplitude of the sinusoidal voltage during each pulse time may be greater than a maximum amplitude of the sinusoidal voltage during the previous pulse time.

In addition, an electronic ballast for driving a gas discharge lamp is described herein. The ballast comprises an inverter circuit for receiving a DC bus voltage and for generating a high-frequency square-wave voltage having an operating frequency, a resonant tank circuit for receiving the high-frequency square-wave voltage and generating a sinusoidal voltage for driving the lamp, and a control circuit coupled to the inverter circuit for controlling the operating frequency of the high-frequency AC voltage. The control circuit causes the lamp to strike by controlling the amplitude of the sinusoidal voltage to a low-end amplitude, and then periodically increasing the amplitude of the sinusoidal voltage during successive pulse times and then decreasing the amplitude of the sinusoidal voltage towards the low-end amplitude at the end of each of the successive pulse times until the lamp has struck, where the length of each of the successive pulse times being greater than the length of the previous pulse time.

According to another embodiment of the present invention, a hybrid light source that is adapted to receive power from an AC power source and to produce a total light intensity comprises a continuous-spectrum light source circuit having a continuous-spectrum lamp, and a discrete-spectrum light source circuit having a gas-discharge lamp. The hybrid light sources controls the total light intensity throughout a dimming range from a low-end intensity and high-end intensity. The discrete-spectrum light source circuit also comprises an electronic ballast circuit for driving the gas-discharge lamp.

The ballast circuit has an inverter circuit for generating a high-frequency square-wave voltage having an operating frequency, and a resonant tank circuit for receiving the high-frequency square-wave voltage and generating a sinusoidal voltage for driving the lamp. The hybrid light source further comprises a control circuit coupled to both the continuous-spectrum light source circuit and the discrete-spectrum light source circuit for individually controlling the amount of power delivered to each of the continuous-spectrum lamp and the gas-discharge lamp, such that the total light intensity of the hybrid light source is controlled to a target intensity. The control circuit turns off the gas-discharge lamp and controls only the continuous-spectrum lamp to be illuminated when the target intensity is below the transition intensity. The control circuit illuminates both the continuous-spectrum lamp and the gas-discharge lamp when the target intensity is above the transition intensity. When the target intensity transitions from below to above the transition intensity, the control circuit causes the gas-discharge lamp to strike by controlling the amplitude of the sinusoidal voltage to a low-end amplitude, and then periodically increasing the amplitude of the sinusoidal voltage during successive pulse times and then decreasing the amplitude of the sinusoidal voltage towards the low-end amplitude at the end of each of the successive pulse times until the lamp has struck, where the length of each of the successive pulse times being greater than the length of the previous pulse time.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
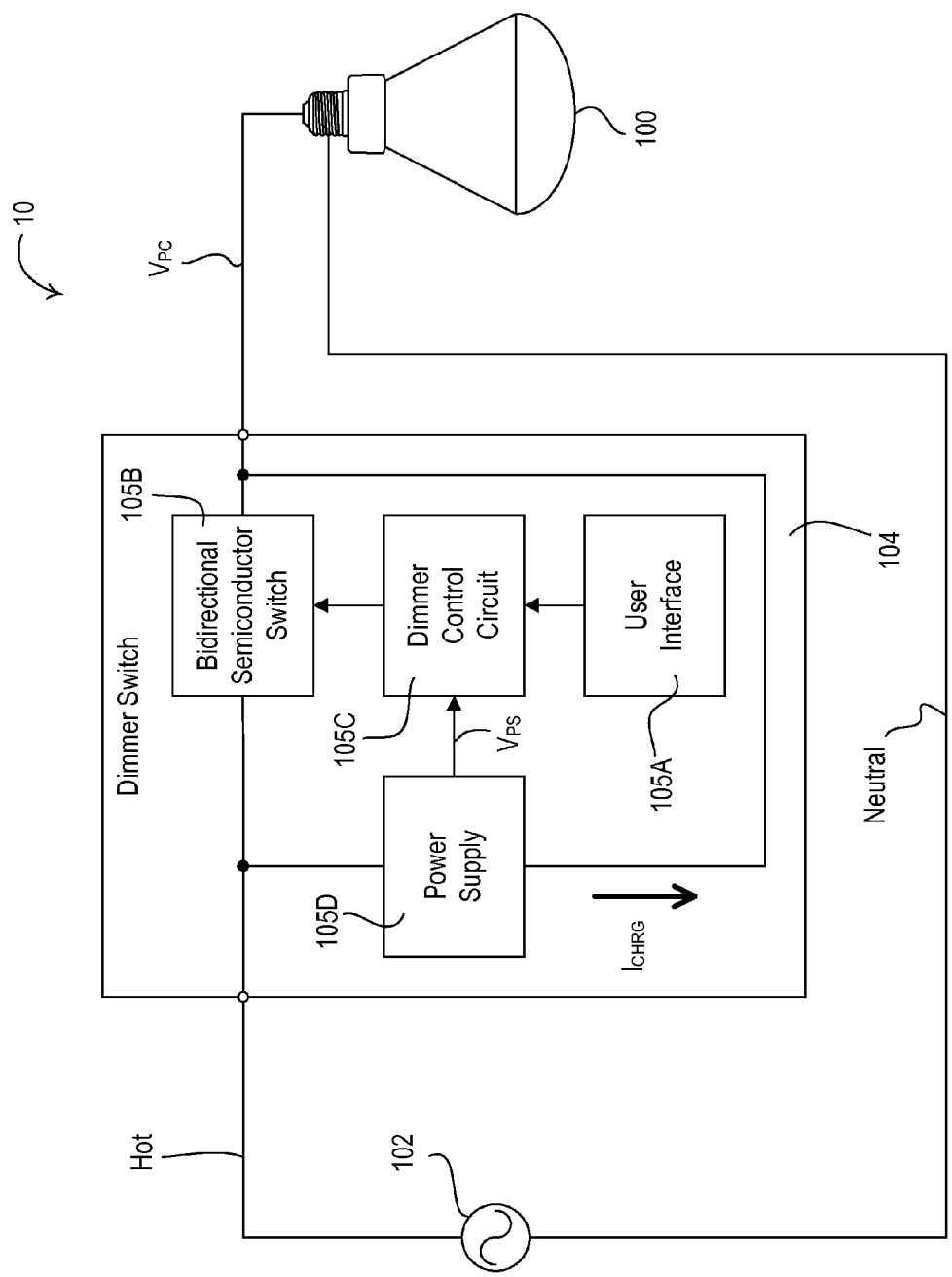
FIG. 1 is a simplified block diagram of a lighting control system including a hybrid light source and a dimmer having a power supply according to an embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a lighting control system 10 including a hybrid light source 100 according to an embodiment of the present invention. The hybrid light source 100 is coupled to the hot side of an alternating-current (AC) power source 102 (e.g., 120 $V_{AC}$, 60 Hz) through a conventional two-wire dimmer switch 104 and is directly coupled to the neutral side of the AC power source. The dimmer switch 104 comprises a user interface 105A including an intensity adjustment actuator (not shown), such as a slider control or a rocker switch. The user interface 105A allows a user to adjust a desired total lighting intensity $L_{DESIRED}$ of the hybrid light source 100 across a dimming range between a low-end lighting intensity $L_{LE}$ (i.e., a minimum intensity, e.g., 0%) and a high-end lighting intensity $L_{HE}$ (i.e., a maximum intensity, e.g., 100%).

The dimmer switch 104 typically includes a bidirectional semiconductor switch 105B, such as, for example, a thyristor (such as a triac) or two field-effect transistors (FETs) coupled in anti-series connection, for providing a phase-controlled voltage $V_{PC}$ (i.e., a dimmed-hot voltage) to the hybrid light source 100. Using a standard forward phase-control dimming technique, a control circuit 105C renders the bidirectional semiconductor switch 105B conductive at a specific time each half-cycle of the AC power source, such that the bidirectional semiconductor switch remains conductive for a conduction period $T_{CON}$ during each half-cycle. The dimmer switch 104 controls the amount of power delivered to the hybrid light source 100 by controlling the length of the conduction period $T_{CON}$. The dimmer switch 104 also often comprises a power supply 105D coupled across the bidirectional semiconductor switch 105B for powering the control circuit 105C. The power supply 105D generates a DC supply voltage $V_{PS}$ by drawing a charging current $I_{CHRG}$ from the AC power source 102 through the hybrid light source 100 when the bidirectional semiconductor switch 105B is non-conductive each half-cycle. An example of a dimmer switch having a power supply 105D is described in greater detail in U.S. Pat. No. 5,248,919, issued Sep. 29, 1993, entitled LIGHTING CONTROL DEVICE, the entire disclosure of which is hereby incorporated by reference.

Alternatively, the dimmer switch 104 could comprise a two-wire analog dimmer switch having a timing circuit (not shown) and a trigger circuit (not shown). The timing circuit conducts a timing current from the AC power source through the hybrid light source 100 when the bidirectional semiconductor switch 105B is non-conductive each half-cycle. The timing current is used to control when the bidirectional semiconductor switch 105B is rendered conductive each half-cycle.

Figure 2:
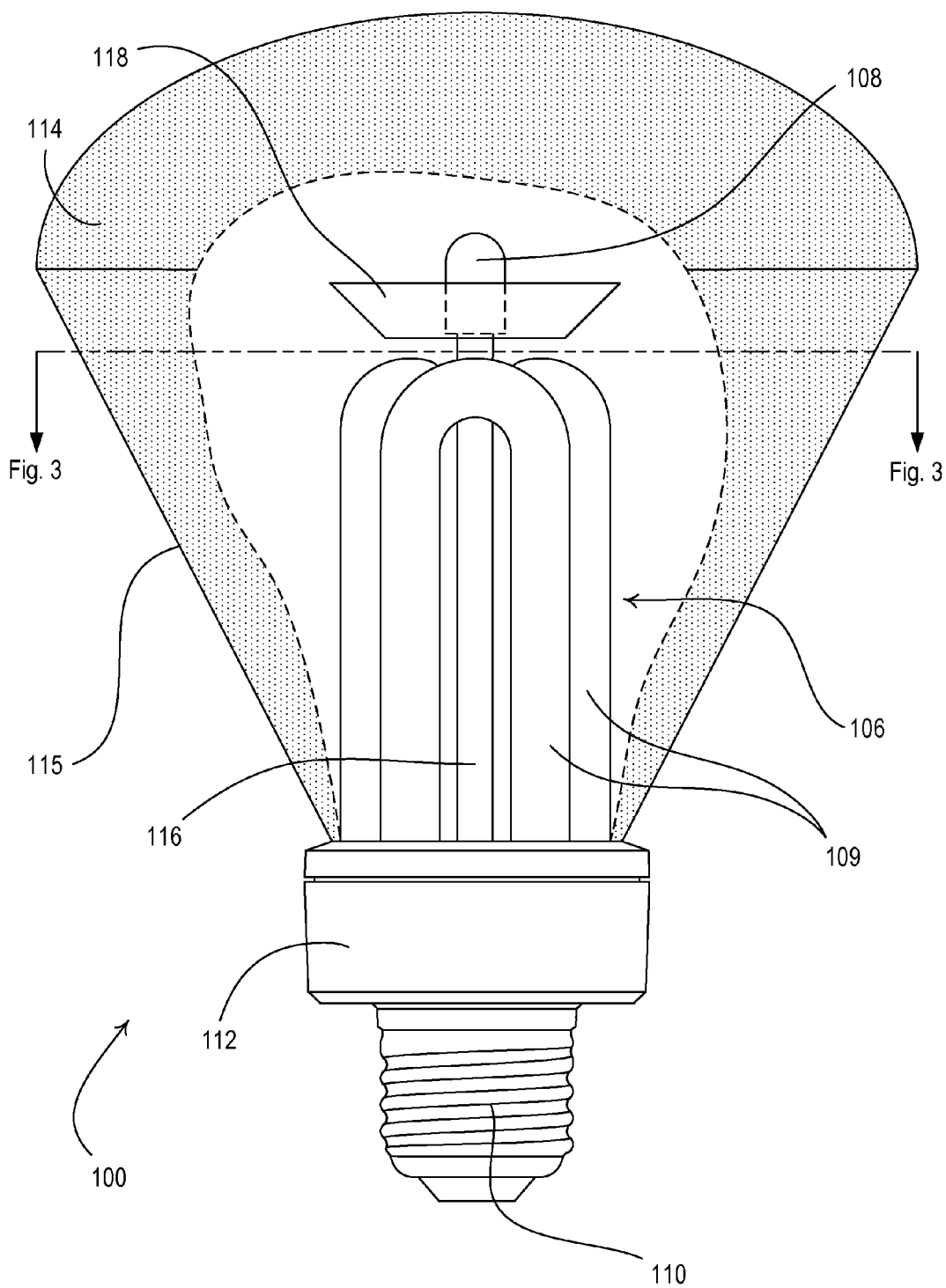
FIG. 2 is a simplified side view of the hybrid light source of FIG. 1.
Figure 3:
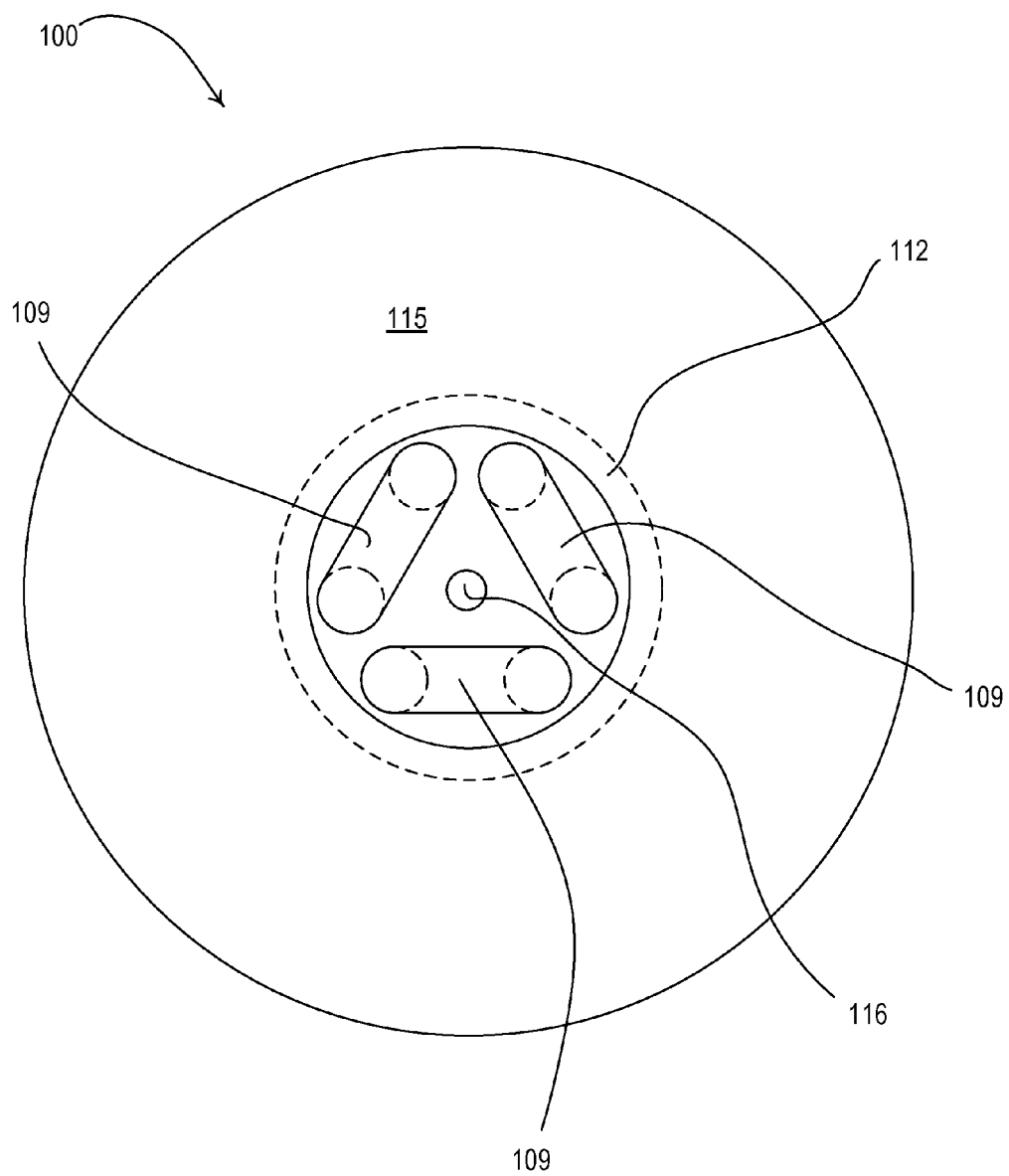
FIG. 3 is a simplified top cross-sectional view of the hybrid light source of FIG. 2.

FIG. 2 is a simplified side view and FIG. 3 is a simplified top cross-sectional view of the hybrid light source 100. The hybrid light source 100 comprises both a discrete-spectrum lamp and a continuous-spectrum lamp. The discrete-spectrum lamp may comprise, for example, a gas discharge lamp, such as, a compact fluorescent lamp 106. The compact fluorescent lamp 106 may comprise, for example, three curved gas-filled glass tubes 109 as shown in FIG. 2. The continuous-spectrum lamp may comprise, for example, an incandescent lamp (such as halogen lamp 108) or any suitable low-efficiency lamp having a continuous spectrum. For example, the halogen lamp 108 may comprise a low-voltage halogen lamp that may be energized by a voltage having a magnitude ranging from approximately 12 volts to 24 volts. Alternatively, the halogen lamp 108 may comprise a line-voltage halogen lamp (e.g., energized by an AC voltage having an amplitude of approximately 120 $V_{AC}$). The discrete-spectrum lamp (i.e., the fluorescent lamp 106) may have a greater efficacy than the continuous-spectrum lamp (i.e., the halogen lamp 108). For example, the fluorescent lamp 106 may be typically characterized by an efficacy greater than approximately 60 lm/W, while the halogen lamp 108 may be typically characterized by an efficacy less than approximately 30 lm/W.

The hybrid light source 100 comprises, for example, a screw-in Edison base 110 for connection to a standard Edison socket, such that the hybrid light source may be coupled to the AC power source 102. The screw-in base 110 has two input terminals 110A, 110B (FIG. 5) for receipt of the phase-controlled voltage $V_{PC}$ and for coupling to the neutral side of the AC power source 102. A hybrid light source electrical circuit 120 (FIG. 5) is housed in an enclosure 112 and controls the amount of power delivered from the AC power source to each of the fluorescent lamp 106 and the halogen lamp 108. The fluorescent lamp 106 and halogen lamp 108 may be surrounded by a housing comprising a light diffuser 114 (e.g., a glass light diffuser) and a fluorescent lamp reflector 115. The fluorescent lamp reflector 115 directs the light emitted by the fluorescent lamp 106 away from the hybrid light source 100. The halogen lamp 108 is mounted to a post 116, such that the halogen lamp is situated beyond the terminal end of the fluorescent lamp 106. The post 116 allows the halogen lamp to be electrically connected to the hybrid light source electrical circuit 120. A halogen lamp reflector 118 surrounds the halogen lamp 108 and directs the light emitted by the halogen lamp in the same direction as the fluorescent lamp reflector 115 directs the light emitted by the fluorescent lamp 106.

Figure 4A:
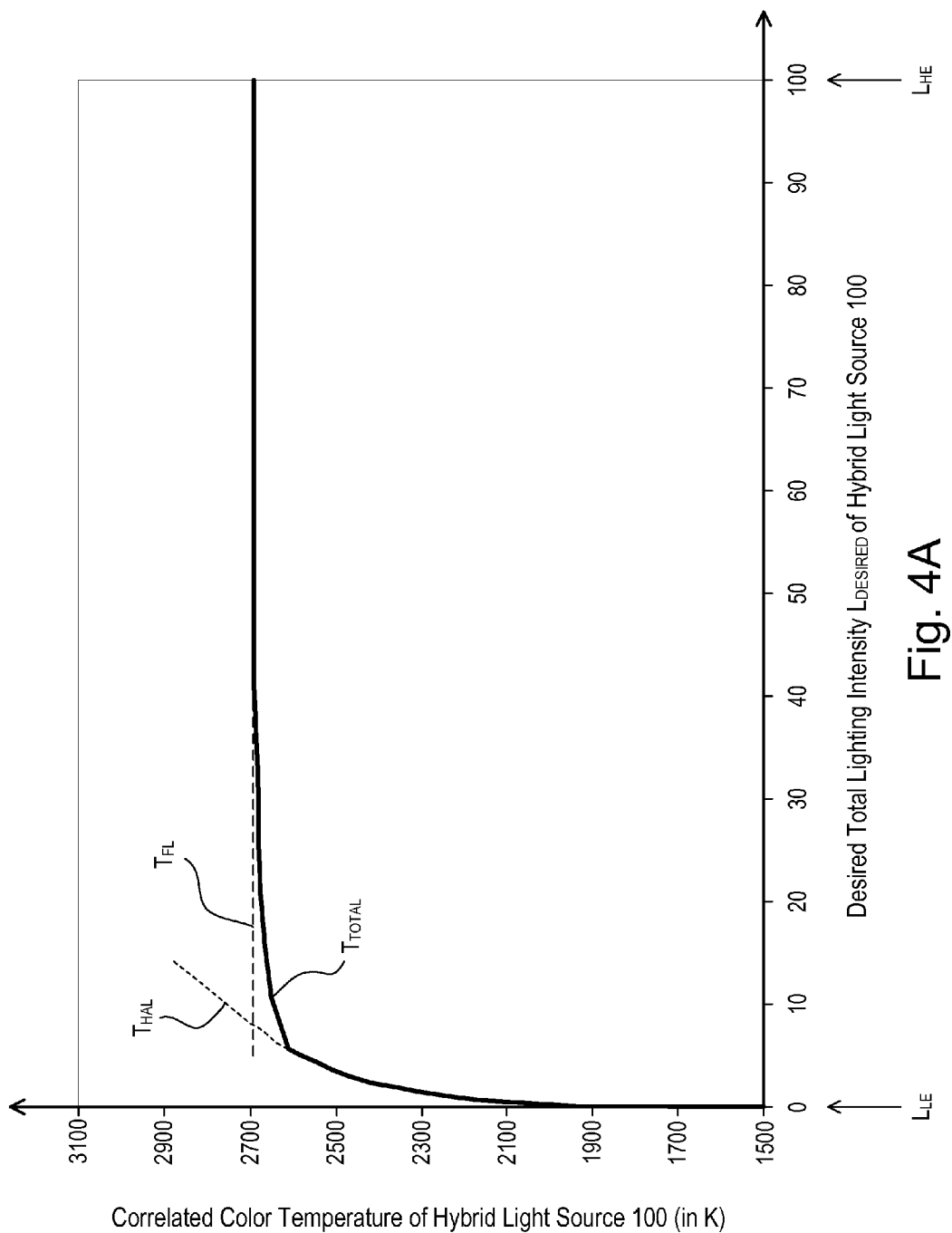
FIG. 4A is a simplified graph showing a total correlated color temperature of the hybrid light source of FIG. 2 plotted with respect to a desired total lighting intensity of the hybrid light source.

The hybrid light source 100 provides an improved color rendering index and correlated color temperature across the dimming range of the hybrid light source (particularly, near a low-end lighting intensity $L_{LE}$) as compared to a stand-alone compact fluorescent lamp. FIG. 4A is a simplified graph showing a total correlated color temperature $T_{TOTAL}$ of the hybrid light source 100 plotted with respect to the desired total lighting intensity $L_{DESIRED}$ of the hybrid light source 100 (as determined by the user actuating the intensity adjustment actuator of the user interface 105A of the dimmer switch 104). A correlated color temperature $T_{FL}$ of a stand-alone compact fluorescent lamp remains constant at approximately 2700 Kelvin throughout most of the dimming range. A correlated color temperature $T_{HAL}$ of a stand-alone halogen lamp decreases as the halogen lamp is dimmed to low intensities causing a desirable color shift towards the red portion of the color spectrum and creating a warmer effect on the human eye. The hybrid light source 100 is operable to individually control the intensities of the fluorescent lamp 106 and the halogen lamp 108, such that the total correlated color temperature $T_{TOTAL}$ of the hybrid light source 100 more closely mimics the correlated color temperature of the halogen lamp at low light intensities, thus more closely meeting the expectations of a user accustomed to dimming low-efficiency lamps.

Figure 4B:
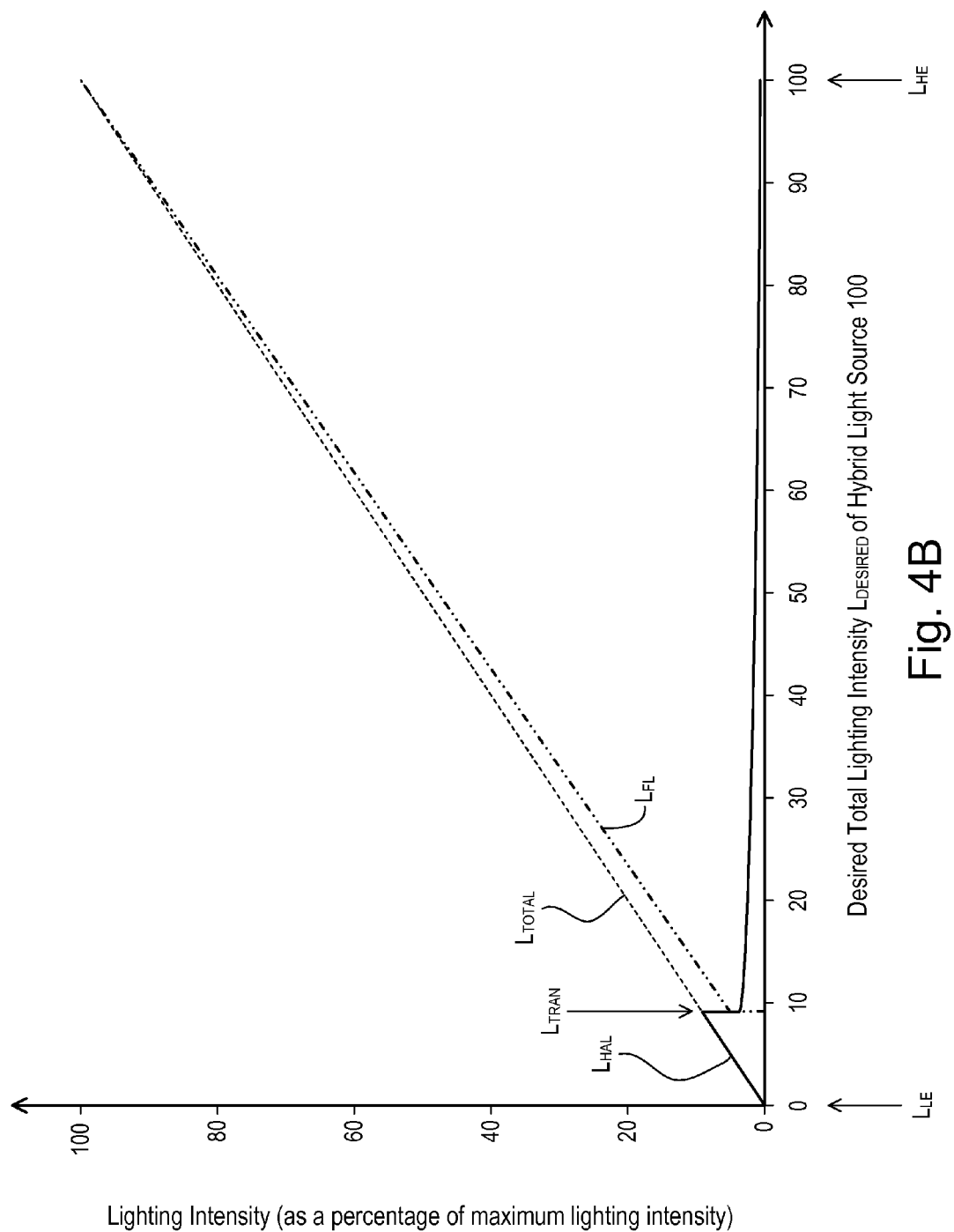
FIG. 4B is a simplified graph showing a target fluorescent lamp lighting intensity, a target halogen lamp lighting intensity, and a total lighting intensity of the hybrid light source of FIG. 2 plotted with respect to the desired total lighting intensity.

The hybrid light source 100 is further operable to control the fluorescent lamp 106 and the halogen lamp 108 to provide high-efficiency operation near the high-end intensity $L_{HE}$. FIG. 4B is a simplified graph showing a target fluorescent lighting intensity $L_{FL}$, a target halogen lighting intensity $L_{HAL}$, and a target total lighting intensity $L_{TOTAL}$ plotted with respect to the desired total lighting intensity $L_{DESIRED}$ of the hybrid light source 100 (as determined by the user actuating the intensity adjustment actuator of the dimmer switch 104). The target fluorescent lighting intensity $L_{FL}$ and the target halogen lighting intensity $L_{HAL}$ (as shown in FIG. 4B) provide for a decrease in color temperature near the low-end intensity $L_{LE}$ and high-efficiency operation near the high-end intensity $L_{HE}$. Near the high-end intensity $L_{HE}$, the fluorescent lamp 106 (i.e., the high-efficiency lamp) provides a greater percentage of the total light intensity $L_{TOTAL}$ of the hybrid light source 100. As the total light intensity $L_{TOTAL}$ of the hybrid light source 100 decreases, the halogen lamp 108 is controlled such that the halogen lamp begins to provide a greater percentage of the total light intensity.

The structure and operation of the hybrid light source 100 is described in greater detail in commonly-assigned, co-pending U.S. patent application Ser. No. 12/205,571, filed Sep. 8, 2008; U.S. patent application Ser. No. 12/553,612, filed Sep. 3, 2009; and U.S. patent application Ser. No. 12/704,781, filed Feb. 12, 2010; each entitled HYBRID LIGHT SOURCE, the entire disclosures of which are hereby incorporated by reference.

Because the fluorescent lamp 106 cannot be dimmed to very low intensities without the use of more expensive and complex circuits, the fluorescent lamp 106 is controlled to be off at a transition intensity $L_{TRAN}$, e.g., approximately 8% (as shown in FIG. 4B) or up to approximately 30%. Across the dimming range of the hybrid light source 100, the intensities of the fluorescent lamp 106 and the halogen lamp 108 are individually controlled such that the target total light intensity $L_{TOTAL}$ of the hybrid light source 100 is substantially linear as shown in FIG. 4B. Below the transition intensity $L_{TRAN}$, the halogen lamp provides all of the total light intensity $L_{TOTAL}$ of the hybrid light source 100, thus providing for a lower low-end intensity $L_{LE}$ than can be provided by a stand-alone fluorescent lamp. Immediately above the transition intensity $L_{TRAN}$, the fluorescent lamp 106 is controlled to a minimum fluorescent intensity $L_{FL-MIN}$. Immediately below the transition intensity $L_{TRAN}$, the halogen lamp 108 is controlled to a maximum halogen intensity $L_{HAL-MAX}$, which is, for example, approximately 80% of the maximum rated intensity of the halogen lamp. When the desired total lighting intensity $L_{DESIRED}$ of the hybrid light source 100 transitions above the transition intensity $L_{TRAN}$, the target halogen lighting intensity $L_{HAL}$ is reduced below the maximum halogen intensity $L_{HAL-MAX}$ and fluorescent lamp 106 is controlled to a minimum fluorescent intensity $L_{FL-MIN}$ (e.g., approximately 5%), such that the total light intensity $L_{TOTAL}$ is approximately equal to the maximum halogen intensity $L_{HAL-MAX}$. Since the fluorescent lamp 106 is turned on at the transition intensity $L_{TRAN}$ in the middle of the dimming range of the hybrid light source 100 as shown in FIG. 4B, the hybrid light source 100 of the present invention provides a method of striking the fluorescent lamp 106 to turn the lamp on to low-end (i.e., to the minimum fluorescent intensity $L_{FL-MIN}$) that avoids flickering, flashing, or brightness overshoot of the intensity of the lamp as will be described in greater detail below.

Figure 5:
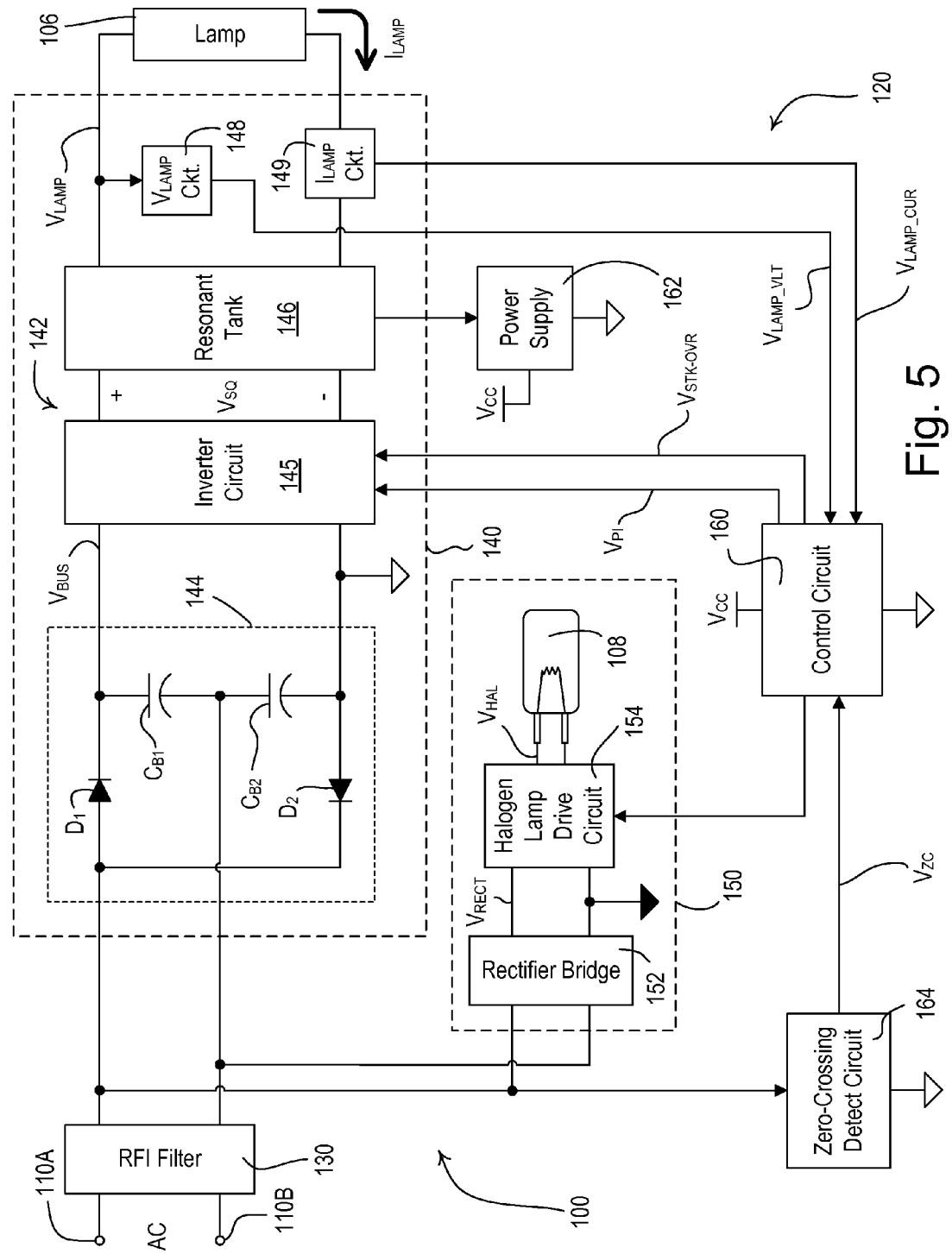
FIG. 5 is a simplified block diagram of the hybrid light source of FIG. 2.

FIG. 5 is a simplified block diagram of the hybrid light source 100 showing the hybrid light source electrical circuit 120. The hybrid light source 100 comprises a radio-frequency interference (RFI) filter 130 coupled across the input terminals 110A, 110B for minimizing the noise provided to the AC power source 102. The hybrid light source 100 further comprises a high-efficiency light source circuit 140 (i.e., a discrete-spectrum light source circuit) for illuminating the fluorescent lamp 106 and a low-efficiency light source circuit 150 (i.e., a continuous-spectrum light source circuit) for illuminating the halogen lamp 108. A control circuit 160 simultaneously controls the operation of the high-efficiency light source circuit 140 and the low-efficiency light source circuit 150 to thus control the amount of power delivered to each of the fluorescent lamp 106 and the halogen lamp 108. A power supply 162 generates a direct-current (DC) supply voltage $V_{CC}$ (e.g., 5 $V_{DC}$) for powering the control circuit 160.

The control circuit 160 is operable to determine the desired total lighting intensity $L_{DESIRED}$ of the hybrid light source 100 in response to a zero-crossing detect circuit 164 (i.e., as determined by the user actuating the intensity adjustment actuator of the user interface 105A of the dimmer switch 104). The zero-crossing detect circuit 164 provides a zero-crossing control signal $V_{ZC}$, representative of the zero-crossings of the phase-controlled voltage $V_{PC}$, to the control circuit 160. A zero-crossing is defined as the time at which the phase-controlled voltage $V_{PC}$ changes from having a magnitude of substantially zero volts to having a magnitude greater than a predetermined zero-crossing threshold $V_{TH-ZC}$ (and vice versa) each half-cycle. Specifically, the zero-crossing detect circuit 164 compares the magnitude of the rectified voltage to the predetermined zero-crossing threshold $V_{TH-ZC}$ (e.g., approximately 20 V), and drives the zero-crossing control signal $V_{ZC}$ high (i.e., to a logic high level, such as, approximately the DC supply voltage $V_{CC}$) when the magnitude of the phase-controlled voltage $V_{PC}$ is greater than the predetermined zero-crossing threshold $V_{TH-ZC}$. Further, the zero-crossing detect circuit 164 drives the zero-crossing control signal $V_{ZC}$ low (i.e., to a logic low level, such as, approximately circuit common) when the magnitude of the phase-controlled voltage $V_{PC}$ is less than the predetermined zero-crossing threshold $V_{TH-ZC}$. The control circuit 160 determines the length of the conduction period $T_{CON}$ of the phase-controlled voltage $V_{PC}$ in response to the zero-crossing control signal $V_{ZC}$, and then determines the target lighting intensities for both the fluorescent lamp 106 and the halogen lamp 108 to produce the target total lighting intensity $L_{TOTAL}$ of the hybrid light source 100 in response to the conduction period $T_{CON}$ of the phase-controlled voltage $V_{PC}$. Alternatively, the zero-crossing detect circuit 164 may provide some hysteresis in the level of the zero-crossing threshold $V_{TH-ZC}$.

The low-efficiency light source circuit 150 comprises a full-wave rectifier 152 for generating a rectified voltage $V_{RECT}$ (from the phase-controlled voltage $V_{PC}$) and a halogen lamp drive circuit 154, which receives the rectified voltage $V_{RECT}$ and controls the amount of power delivered to the halogen lamp 108. The low-efficiency light source circuit 150 is coupled between the rectified voltage $V_{RECT}$ and the rectifier common connection (i.e., across the output of the front end circuit 130). The control circuit 160 is operable to control the intensity of the halogen lamp 108 to the target halogen lighting intensity $L_{HAL}$ corresponding to the present value of the desired total lighting intensity $L_{DESIRED}$ of the hybrid light source 100, e.g., to the target halogen lighting intensity as shown in FIG. 4B. Since the halogen lamp 108 is a low-voltage halogen lamp, the halogen drive circuit 154 comprises a low-voltage transformer (not shown) coupled between the rectifier 152 and the halogen lamp.

The high-efficiency light source circuit 140 comprises a fluorescent drive circuit (e.g., a dimmable electronic ballast circuit 142) for receiving the phase-controlled voltage $V_{PC}$ (via the RFI filter 130) and for driving the fluorescent lamp 106. Specifically, the phase-controlled voltage $V_{PC}$ is coupled to a voltage doubler circuit 144, which generates a bus voltage $V_{BUS}$ across two series connected bus capacitors $C_{B1}$, $C_{B2}$. The first bus capacitor $C_{B1}$ is operable to charge through a diode $D_1$ during the positive half-cycles, while the second bus capacitor $C_{B2}$ is operable to charge through a diode $D_2$ during the negative half-cycles. The ballast circuit 142 includes an inverter circuit 145 for converting the DC bus voltage $V_{BUS}$ to a high-frequency square-wave voltage $V_{SQ}$. The high-frequency square-wave voltage $V_{SQ}$ is characterized by an operating frequency $f_{OP}$ (and an operating period $T_{OP}=1/f_{OP}$). The ballast circuit 142 further comprises an output circuit, e.g., a resonant tank circuit 146, for filtering the square-wave voltage $V_{SQ}$ to produce a substantially sinusoidal high-frequency AC voltage $V_{SIN}$, which is coupled to the electrodes of the fluorescent lamp 106. The high-efficiency lamp source circuit 140 further comprises a lamp voltage measurement circuit 148 (which provides a lamp voltage control signal $V_{LAMP\_VLT}$ representative of an amplitude of a lamp voltage $V_{LAMP}$ to the control circuit 160), and a lamp current measurement circuit 149 (which provides a lamp current control signal $V_{LAMP\_CUR}$ representative of an amplitude of a lamp current $I_{LAMP}$ to the control circuit).

The control circuit 160 is operable to control the inverter circuit 145 of the ballast circuit 140 to control the intensity of the fluorescent lamp 106 to the target fluorescent lighting intensity $L_{FL}$ corresponding to the present value of the desired total lighting intensity $L_{DESIRED}$ of the hybrid light source 100 in response to the zero-crossing control signal $V_{ZC}$ from the zero-crossing detect circuit 164 (i.e., according to the graph shown in FIG. 4B). The control circuit 160 determines a target lamp current $I_{TARGET}$ for the fluorescent lamp 106 that corresponds to the target fluorescent lighting intensity $L_{FL}$. The control circuit 160 then controls the operation of the inverter circuit 145 in response to the lamp voltage control signal $V_{LAMP\_VLT}$ and the lamp current control signal $V_{LAMP\_CUR}$, in order to control the lamp current $I_{LAMP}$ towards the target lamp current $I_{TARGET}$.

Figure 6:
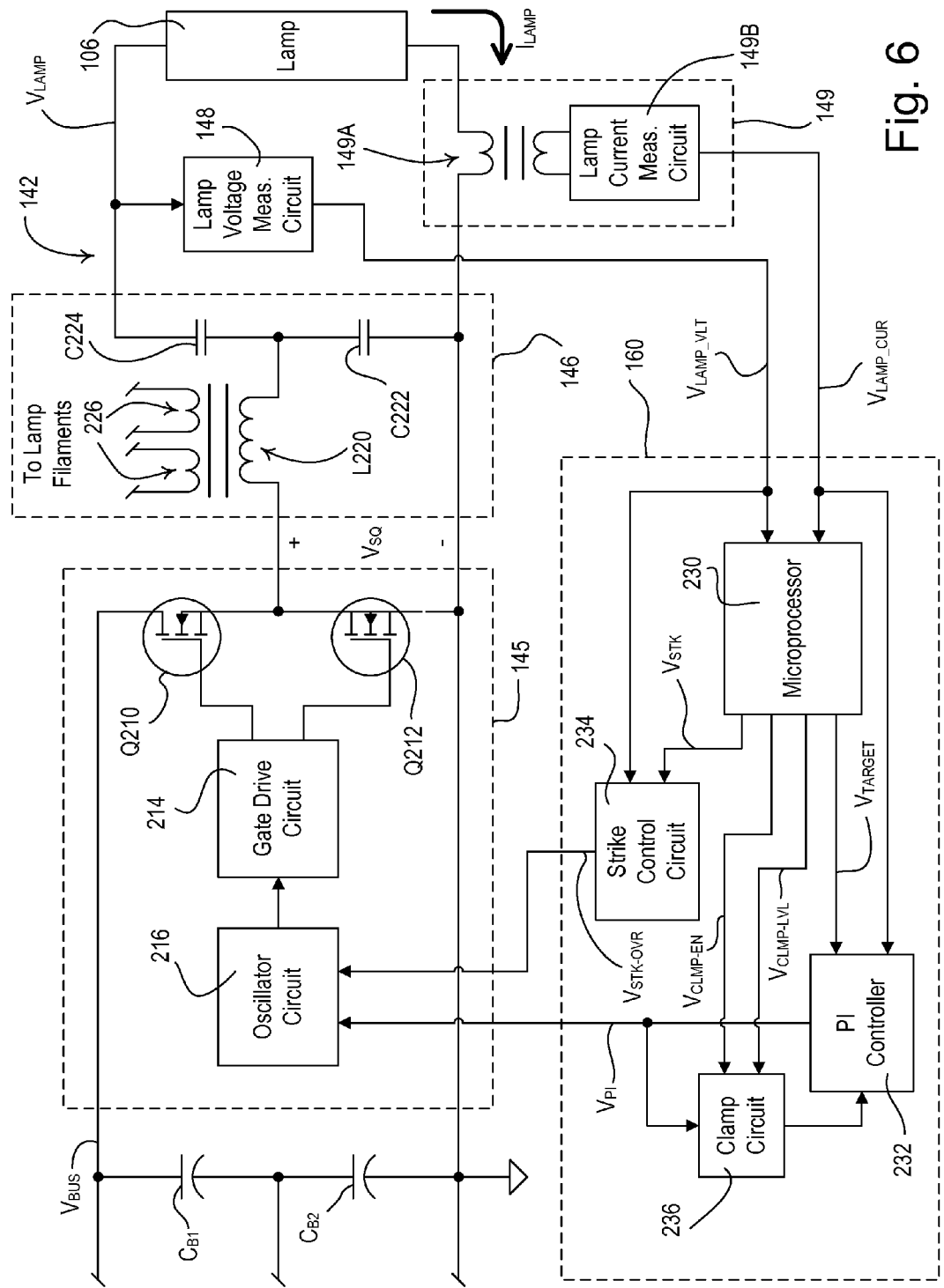
FIG. 6 is a simplified schematic diagram showing a portion of the hybrid light source of FIG. 2 according to a first embodiment of the present invention.
Figure 7:
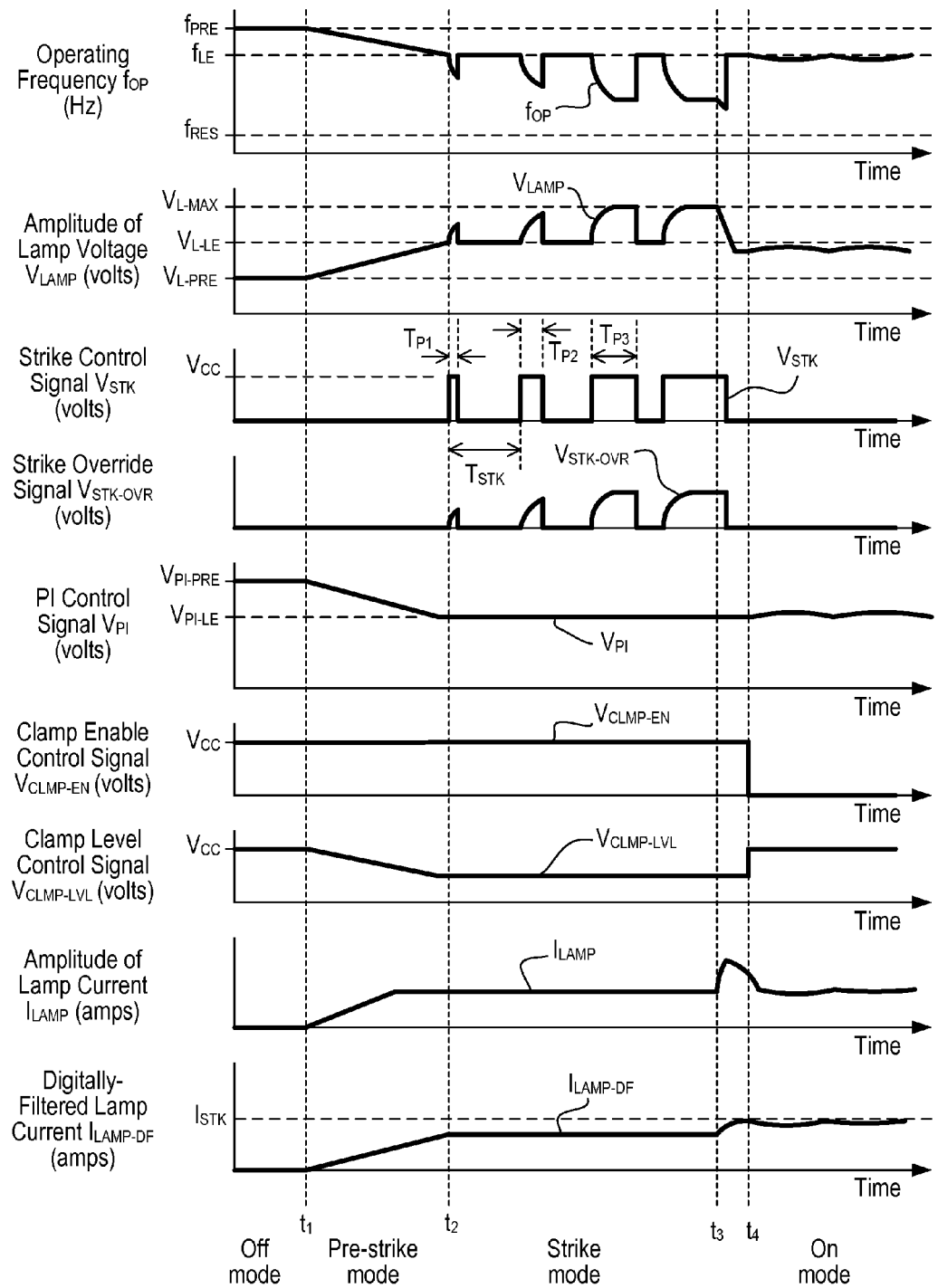
FIG. 7 shows example waveforms that illustrate the operation of the hybrid light source of FIG. 2.

FIG. 6 is a simplified schematic diagram of the hybrid light source 100 showing the inverter circuit 145, the resonant tank 146, and the control circuit 160 of the hybrid light source electrical circuit 120 in greater detail according to a first embodiment of the present invention. FIG. 7 shows example waveforms that illustrate the operation of the hybrid light source electrical circuit 120. The inverter circuit 145 comprises first and second semiconductor switches, e.g., field-effect transistors (FETs) Q210, Q212, and a gate drive circuit 214, which is coupled to control inputs (i.e., gates) of the FETs for rendering the FETs conductive and non-conductive in order to generate the high-frequency square-wave voltage $V_{SQ}$ at the output of the inverter circuit. The gate drive circuit 214 controls the FETS Q210, Q212 in response to an oscillator circuit 216, which sets the operating frequency $f_{OP}$ of the high-frequency square-wave voltage $V_{SQ}$. The control circuit 160 controls the oscillator circuit 216 to adjust the operating frequency $f_{OP}$ of the high-frequency square-wave voltage $V_{SQ}$ as will be described in greater detail below.

The high-frequency square-wave voltage $V_{SQ}$ is provided to the resonant tank circuit 146, which includes a resonant inductor L220 and a resonant capacitor C222. The resonant inductor L220 and the resonant capacitor C222 operate to filter the high-frequency square-wave voltage $V_{SQ}$ to produce the substantially sinusoidal voltage $V_{SIN}$ for driving the fluorescent lamp 106. The amplitude of the sinusoidal voltage $V_{SIN}$ is dependent upon the operating frequency $f_{OP}$ of the high-frequency square-wave voltage $V_{SQ}$. The resonant tank circuit 146 is characterized by a resonant frequency $f_{RES}$, which is defined by the values of the resonant inductor L220 and the resonant capacitor C222. The sinusoidal voltage $V_{SIN}$ is coupled to the fluorescent lamp 106 through a DC-blocking capacitor C224, which prevents any DC characteristics of the inverter circuit 145 from being coupled to the fluorescent lamp 106. The resonant inductor 220 is magnetically coupled to two filament windings 226, which are electrically coupled to the filaments of the fluorescent lamp 106. The power supply 162 (FIG. 5) may draw current from an additional winding (not shown) that is magnetically coupled to the resonant inductor 220.

Before the fluorescent lamp 106 is turned on (i.e., struck), the filaments of the lamp must be heated in order to extend the life of the lamp. Particularly, whenever the fluorescent lamp 106 of the hybrid light source 100 of the present invention is not illuminated, the operating frequency $f_{OP}$ of the inverter circuit 145 is controlled to a preheat frequency $f_{PRE}$ (as shown in FIG. 7), such that the amplitude of the voltage generated across the first and second windings of the resonant inductor L220 increases, and the filament windings 226 provide filament voltages to the filaments of the fluorescent lamp 106 for heating the filaments.

The control circuit 160 comprises, for example, a microprocessor 230 for managing the operation of the FETs Q210, Q212 of the inverter circuit 145. The microprocessor 230 may alternatively be implemented as a programmable logic device (PLD), a microcontroller, an application specific integrated circuit (ASIC), or any other suitable processing device or control circuit. The microprocessor 230 generates a target control signal $V_{TARGET}$, which comprises, for example, a DC voltage having a magnitude representative of the target fluorescent lighting intensity $L_{FL}$ of the fluorescent lamp 106. The control circuit 160 also includes a proportional-integral (PI) controller 232, which attempts to minimize the error between target control signal $V_{TARGET}$ and the lamp current control signal $V_{LAMP\_CUR}$ (i.e., the difference between the target lamp current $I_{TARGET}$ for the fluorescent lamp 106 and the present amplitude of the lamp current $I_{LAMP}$). The PI controller 232 has an output for generating an output control signal $V_{PI}$, which is representative of the operating frequency $f_{OP}$ required to control the lamp current $I_{LAMP}$ to be equal to the target lamp current $I_{TARGET}$.

The control circuit 160 further comprises a strike control circuit 234, which controls the operating frequency $f_{OP}$ of the inverter circuit 145 during striking of the fluorescent lamp 106. Specifically, the strike control circuit 234 receives a strike control signal $V_{STK}$ from the microprocessor 230 and provides a strike override control signal $V_{STK-OVR}$ to the oscillator circuit 216 of the inverter circuit 145, such that the oscillator circuit adjusts the operating frequency $f_{OP}$ of the inverter circuit 145 in response to the strike override control signal $V_{STK-OVR}$. The strike control circuit 234 also receives the lamp voltage control signal $V_{LAMP\_VLT}$ from the lamp voltage measurement circuit 148 and regulates the magnitude of the strike override control signal $V_{STK-OVR}$ so as to limit the amplitude of the lamp voltage $V_{LAMP}$ to a maximum lamp voltage $V_{L-MAX}$ (as shown in FIG. 7).

The control circuit 160 further comprises a clamp circuit 236, which is controlled in response to a clamp enable control signal $V_{CLMP-EN}$ and a clamp level control signal $V_{CLMP-LVL}$ that are generated by the microprocessor 230. The clamp circuit 236 operates to clamp the output of the PI controller 232 (i.e., the output control signal $V_{PI}$) when the clamp enable control signal $V_{CLMP-EN}$ is driven high (i.e., to approximately the supply voltage $V_{CC}$). When the clamp level control signal $V_{CLMP-LVL}$ is driven high to, for example, approximately the supply voltage $V_{CC}$, the output control signal $V_{PI}$ of the in controller 232 is clamped to a pre-heat control voltage $V_{PI-PRE}$, which causes the operating frequency $f_{OP}$ of the inverter circuit 145 to be controlled to the preheat frequency $f_{PRE}$ for pre-heating the filaments of the lamp 106. The microprocessor 230 is operable to decrease the clamp level control signal $V_{CLMP-LVL}$ below the supply voltage $V_{CC}$ prior to attempting to strike the fluorescent lamp 106.

According to the present invention, the control circuit 160 attempts to strike the fluorescent lamp 106 by periodically "blipping" the operating frequency $f_{OP}$ of the inverter circuit 145 down towards the resonant frequency $f_{RES}$ to control the amplitude of the lamp voltage $V_{LAMP}$ as shown in FIG. 7. The plot of the amplitude of the lamp voltage $V_{LAMP}$ shown in FIG. 7 represents the envelope of the actual high-frequency lamp voltage $V_{LAMP}$. When a lamp strike is requested (i.e., when the desired total lighting intensity $L_{DESIRED}$ is increased above the transition intensity $L_{TRAN}$), the microprocessor 130 first controls the operating frequency $f_{OP}$ to a low-end frequency $f_{LE}$ and then increases the amplitude of the lamp voltage $V_{LAMP}$ during successive pulse times (e.g., $T_{P1}$, $T_{P2}$, $T_{P3}$ shown in FIG. 7), where the length of each of the successive pulse times is greater than the length of the previous pulse time (i.e., the successive pulse times have increasing lengths, such that $T_{P3} > T_{P2} > T_{P1}$). During each of the successive pulse times, the amplitude of the lamp voltage $V_{LAMP}$ increases with respect to time (e.g., exponentially) to a maximum amplitude $V_{MA}$ across the length of the pulse time. The maximum amplitude $V_{MA}$ of the sinusoidal lamp voltage $V_{LAMP}$ during each successive pulse time may be greater than the maximum amplitude $V_{MA}$ of the sinusoidal lamp voltage $V_{LAMP}$ during the previous pulse time, i.e., the maximum amplitude $V_{MA}$ of the sinusoidal lamp voltage $V_{LAMP}$ during the second pulse time $T_{P2}$ is greater than the maximum amplitude $V_{MA}$ during the first pulse time $T_{P1}$. In addition, the amplitude of the lamp voltage $V_{LAMP}$ is limited to the maximum lamp voltage $V_{L-MAX}$ by the strike control circuit 234. Alternatively, the amplitude of the lamp voltage $V_{LAMP}$ could be increased to a constant amplitude (e.g., to the maximum lamp voltage $V_{L-MAX}$) during each of the successive pulse times, such that the maximum amplitudes $V_{MA}$ of the sinusoidal lamp voltage $V_{LAMP}$ during each of the successive pulse times are equal.

When the fluorescent lamp 106 is off (i.e., during an off mode), the microprocessor 230 drives the clamp enable control signal $V_{CLMP-EN}$ high and adjusts the magnitude of the clamp level control signal $V_{CLMP-LVL}$, such that the clamp circuit 236 controls the operating frequency $f_{OP}$ of the inverter circuit 145 to the preheat frequency $f_{PRE}$ (as shown in FIG. 7). Since the operating frequency $f_{OP}$ is maintained at the preheat frequency $f_{PRE}$ when the fluorescent lamp 106 is off, the filaments will be heated appropriately when the fluorescent lamp is turned on in response to a change in the desired total lighting intensity $L_{DESIRED}$ that transitions above the transition intensity $L_{TRAN}$ (e.g., in response to an actuation of the intensity adjustment actuator of the dimmer switch 104). When a fluorescent lamp strike is requested (i.e., when the desired total lighting intensity $L_{DESIRED}$ is increased above the transition intensity $L_{TRAN}$), the operating frequency $f_{OP}$ of the inverter circuit 145 is controlled such that the amplitude of the voltage across the resonant capacitor C222 increases until the fluorescent lamp 106 strikes and the lamp current $I_{LAMP}$ begins to flow through the lamp as will be described in greater detail below.

When the desired total lighting intensity $L_{DESIRED}$ of the hybrid light source 100 is increased above the transition intensity $L_{TRAN}$ (e.g., at time $t_1$ in FIG. 7), the microprocessor 230 will attempt to strike the fluorescent lamp 106 to thus turn the lamp on. Before striking the fluorescent lamp 106 (i.e., during a pre-strike mode), the microprocessor 230 decreases the magnitude of the clamp level control signal $V_{CLMP-LVL}$ with respect to time until the lamp voltage $V_{LAMP}$ rises to a low-end lamp amplitude $V_{L-LE}$ and the operating frequency $f_{OP}$ drops to the low-end frequency $f_{LE}$ (e.g., at time $t_2$ in FIG. 7).

At this time, the microprocessor 230 attempts to strike the fluorescent lamp 106 to thus illuminate the lamp (i.e., during a strike mode). Specifically, the microprocessor 230 drives the strike control signal $V_{STK}$ high in successive pulses of increasing length to periodically adjust the operating frequency $f_{OP}$ of the inverter circuit 145 down towards the resonant frequency $f_{RES}$ as shown FIG. 7 to try to strike the lamp 106. During each successive pulse time, the operating frequency $f_{OP}$ is decreased below the low-end frequency $f_{LE}$, such that the amplitude of the lamp voltage $V_{LAMP}$ increases above the low-end lamp amplitude $V_{L-LE}$. As previously mentioned, the length of each of the successive pulses is greater than the length of the previous pulse. At the beginning of each pulse time, the microprocessor 230 drives the strike control signal $V_{STK}$ high to approximately the supply voltage $V_{CC}$ and the strike control circuit 234 increases the magnitude of the strike override control signal $V_{STK-OVR}$ with respect to time at a predetermined rate across the length of the pulse time (e.g., at an exponential rate as shown in FIG. 7). In response to the magnitude of the strike override control signal $V_{STK-OVR}$, the oscillator circuit 216 decreases the operating frequency $f_{OP}$ of the inverter circuit 145 below the low-end frequency $f_{LE}$ at a similar rate.

The magnitude of the strike override control signal $V_{STK-OVR}$ is regulated by the strike control circuit 234 so as to limit the lamp voltage $V_{LAMP}$ to the maximum lamp voltage $V_{L-MAX}$. When the strike control signal $V_{STK}$ is driven low (i.e., to approximately circuit common), the strike control circuit 234 immediately drives the strike override control signal $V_{STK-OVR}$ low to thus bring the operating frequency $f_{OP}$ back to the low-end frequency $f_{LE}$ set by the clamp circuit 236. For example, the first pulse time $T_{P1}$ during the strike mode may have a minimum length $T_{MIN}$, e.g., approximately 500 μsec. Each subsequent successive pulse time (e.g., $T_{P2}$ and $T_{P3}$) may have a length that is a predetermined increment $T_\Delta$ (e.g., approximately 50 μsec) longer than the previous pulse (e.g., $T_{P2}=T_{P1}+T_\Delta$ and $T_{P3}=T_{P2}+T_\Delta$). In addition, a strike attempt period $T_{STK}$ between the beginnings of the pulses may be constant (e.g., approximately 1.5 msec) as shown in FIG. 7. Accordingly, the control circuit 160 controls the inverter circuit 145 in the strike mode so as to increase the amplitude of the lamp voltage $V_{LAMP}$ during successive pulse times, where the successive pulse times having increasing lengths and may have increasing maximum amplitudes as shown in FIG. 7.

The microprocessor 230 is operable to determine when the fluorescent lamp 106 has struck in response to the amplitude of the lamp current $I_{LAMP}$. The microprocessor 230 digitally filters the amplitude of the lamp current $I_{LAMP}$ (i.e., from the lamp current control signal $V_{LAMP\_CUR}$) to generate a digitally-filtered lamp current $I_{LAMP-DF}$ as shown in FIG. 7. In addition, the lamp current control signal $V_{LAMP\_CUR}$ may be also filtered by an analog filter circuit. The microprocessor 230 determines that the fluorescent lamp 106 has struck when the magnitude of the digitally-filtered lamp current $I_{LAMP-DF}$ rises to a strike current threshold $I_{STK}$. When the fluorescent lamp 106 strikes (e.g., at time $t_3$ in FIG. 7), the amplitude of the lamp current $I_{LAMP}$ increases quickly. The magnitude of the digitally-filtered lamp current $I_{LAMP-DF}$ also increases, but at a slower rate than the amplitude of the lamp current $I_{LAMP}$. Therefore, the microprocessor 230 is operable to detect that the fluorescent lamp 106 has struck a short period of time (e.g., at time $t_4$ in FIG. 7) after the lamp actually struck as shown in FIG. 7.

The "dead times" between the pulse times of the strike control signal $V_{STK}$ (i.e., when the strike control signal $V_{STK}$ is equal to approximately zero volts) help reduce overshoot of the lamp current $I_{LAMP}$ that may be caused by the delay between when the fluorescent lamp 106 strikes and when the digitally-filtered lamp current $I_{LAMP-DF}$ rises to the strike current threshold $I_{STK}$. Overshoot of the lamp current $I_{LAMP}$ can cause visible flicking, flashing, or brightness overshoot of the intensity of the fluorescent lamp 106. Striking of a fluorescent lamp 106 is dependent the amplitude of the lamp voltage $V_{LAMP}$ and the length of time that the lamp voltage $V_{LAMP}$ having that amplitude is coupled across the lamp. Since these parameters may vary from one lamp to another or between different lamp types, different lamps may require different numbers of successive pulse times of the lamp voltage $V_{LAMP}$ in order to strike. Because the amplitude of the lamp voltage $V_{LAMP}$ is only increased during the successive pulse times and is controlled back to approximately the low-end lamp amplitude $V_{L-LE}$ during the dead times of the strike control signal $V_{STK}$, the electronic ballast circuit 142 is able to accommodate striking different lamps having different operating characteristics while minimizing the overshoot of the lamp current $I_{LAMP}$.

When the microprocessor 230 detects that the fluorescent lamp 106 has struck, the microprocessor drives the clamp enable control signal $V_{CMLP-EN}$ low, such that the clamp circuit 236 no longer clamps the output control signal $V_{PI}$ of the PI controller 232. Thus, the operating frequency $f_{OP}$ of the inverter circuit 145 is then controlled in response to the output control signal $V_{PI}$ of the PI controller 232 to drive the lamp current $I_{LAMP}$ to be equal to the target lamp current $I_{TARGET}$ (i.e., during an on mode). Because of the delay between when the fluorescent lamp 106 strikes and when the digitally-filtered lamp current $I_{LAMP-DF}$ rises to the strike current threshold $I_{STK}$, the microprocessor 230 typically detects that the lamp has struck during the dead times of the strike control signal $V_{STK}$. Since the amplitude of the lamp voltage $V_{LAMP}$ is controlled back to approximately the low-end lamp amplitude $V_{L-LE}$ during the dead times, the lamp 106 will be turned on to approximately the minimum fluorescent intensity $L_{FL-MIN}$ and overshoot of the lamp current $I_{LAMP}$ is minimized.

Figure 8A:
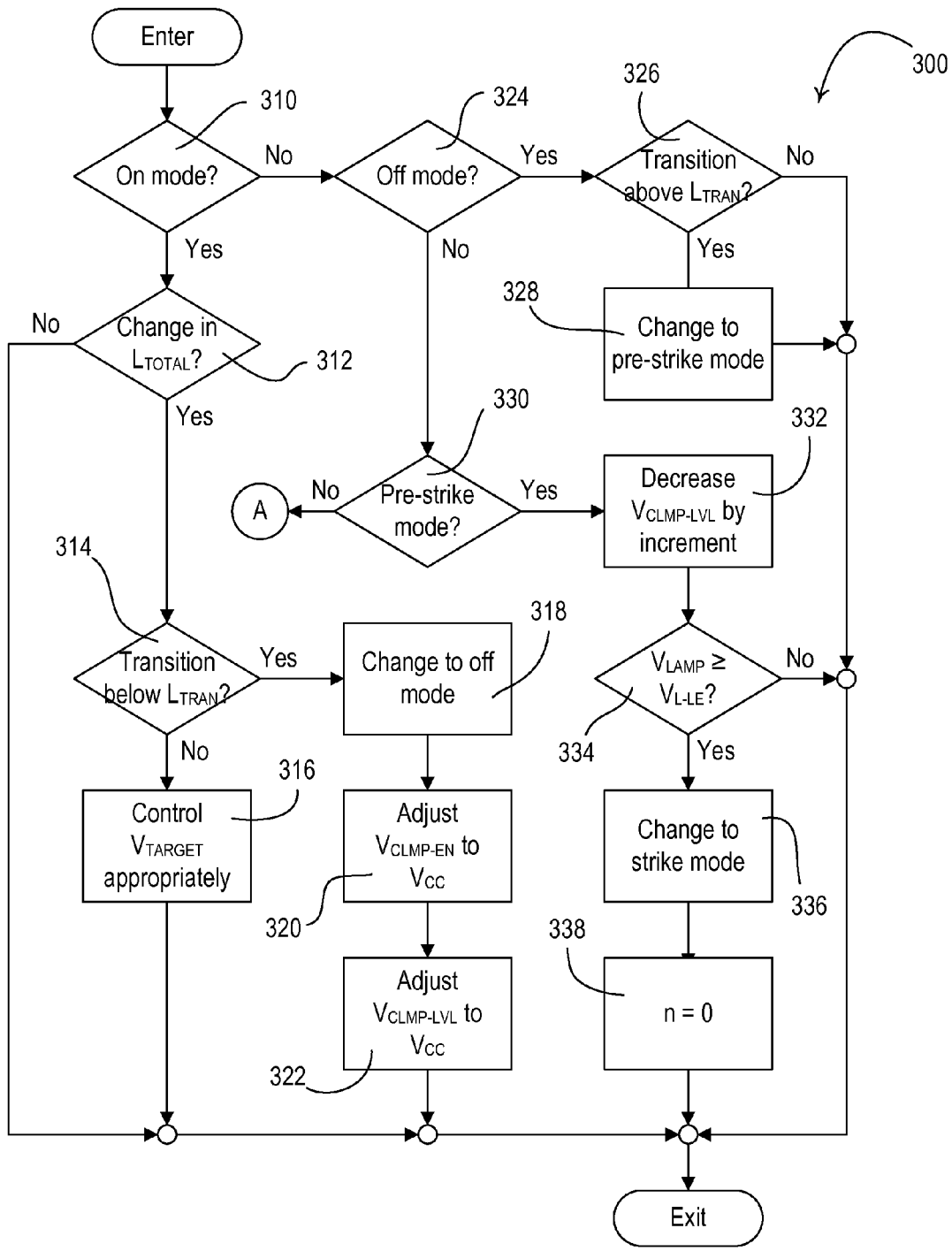
FIGS. 8A and 8B are simplified flowcharts of a fluorescent lamp control procedure executed periodically by a microprocessor of the hybrid light source of FIG. 6 according to the first embodiment of the present invention.
Figure 8B:
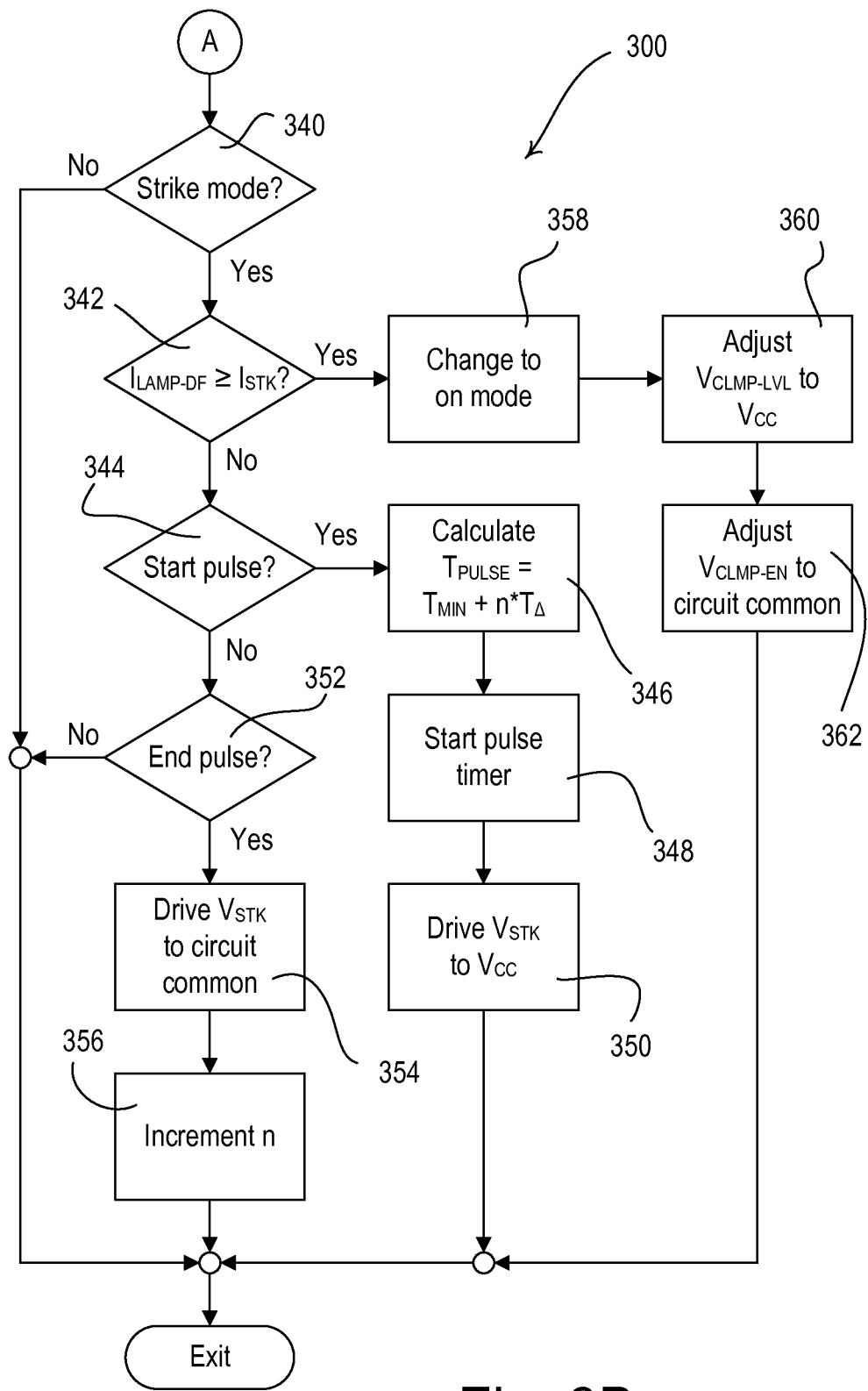

FIGS. 8A and 8B are simplified flowcharts of a fluorescent lamp control procedure 300 executed periodically (e.g., approximately every 100 μsec) by the microprocessor 230 of the control circuit 160 according to the first embodiment of the present invention. If the microprocessor 230 is operating in the on mode at step 310 (i.e., if the fluorescent lamp 106 is illuminated), but there is presently no change in the desired total lighting intensity $L_{DESIRED}$ of the hybrid light source 100 (as determined from the zero-crossing control signal $V_{ZC}$ received from the zero-crossing detect circuit 164) at step 312, the fluorescent lamp control procedure 300 simply exits. If there has been a change in the desired total lighting intensity $L_{DESIRED}$ at step 312, but the change does not take the desired total lighting intensity $L_{DESIRED}$ below the transition intensity $L_{TRAN}$ (i.e., the fluorescent lamp 106 should stay on)

at step 314, the microprocessor 230 adjusts the target control signal $V_{TARGET}$ appropriately in response to the change in the desired total lighting intensity $L_{DESIRED}$ at step 316. However, if the change takes the desired total lighting intensity $L_{DESIRED}$ below the transition intensity $L_{TRAN}$ at step 314, the microprocessor 230 changes to the off mode at step 318 and drives the clamp enable control signal $V_{CLMP-EN}$ high to approximately the supply voltage $V_{CC}$ at step 320. The microprocessor 230 also drives the clamp level control signal $V_{CLMP-LVL}$ high to approximately the supply voltage $V_{CC}$ (to control the operating frequency $f_{OP}$ of the inverter circuit 145 to the preheat frequency $f_{PRE}$) at step 322, before the fluorescent lamp control procedure 300 exits.

If the microprocessor 230 is operating in the off mode (i.e., the fluorescent lamp 106 is off) at step 324 and the microprocessor has received a command to transition the desired total lighting intensity $L_{DESIRED}$ of the hybrid light source 100 above the transition intensity $L_{TRAN}$ at step 326, the microprocessor 230 changes to the pre-strike mode at step 328, before the fluorescent lamp control procedure 300 exits. If the microprocessor 230 is not operating in the off mode at step 324, but is operating in the pre-strike mode at step 330, the microprocessor 230 decreases the magnitude of the clamp level control signal $V_{CLMP-LVL}$ by a predetermined value $V_{CLMP\Delta}$ at step 332, such that the operating frequency $f_{OP}$ will decrease and the lamp voltage $V_{LAMP}$ will increase. As the microprocessor 230 continues to periodically execute the fluorescent lamp control procedure 300 while in the pre-strike mode, the microprocessor will continue to decrease the magnitude of the clamp level control signal $V_{CLMP-LVL}$ by the predetermined value $V_{CLMP\Delta}$ at step 332. When the amplitude of the lamp voltage $V_{LAMP}$ (as determined from the lamp voltage control signal $V_{LAMP\_VLT}$) is greater than or equal to the low-end lamp amplitude $V_{L-LE}$ at step 334, the microprocessor 230 changes to the strike mode at step 336 (during which the microprocessor will maintain the magnitude of the clamp level control signal $V_{CLMP-LVL}$ constant) and sets a variable n equal to zero at step 338, before the fluorescent lamp control procedure 300 exits. The microprocessor 230 uses the variable n to count the number of pulses of the strike control signal $V_{STK}$ during the strike mode.

Referring to FIG. 8B, if the microprocessor 230 is operating in the strike mode at step 340 and the magnitude of the digitally-filtered lamp current $I_{LAMP-DF}$ is less than the strike current threshold $I_{STK}$ at step 342, the microprocessor 230 operates to generate the strike control signal $V_{STK}$ with the successive pulse having increasing pulse lengths, so as to increase the amplitude of the lamp voltage $V_{LAMP}$ during the successive pulse times. The microprocessor 230 uses a pulse timer to determine when to start and end each of the pulse times of the strike control signal $V_{STK}$. For example, the pulse timer may decrease in value with respect to time, and the microprocessor 230 may initialize the pulse timer with the strike attempt period $T_{STK}$, such that microprocessor will begin to generate another pulse when the pulse timer is equal to or less than approximately zero. Specifically, if the microprocessor 230 should begin to generate a new pulse at step 344, the microprocessor determines a length $T_{PULSE}$ of the next pulse time at step 346, i.e., $$T_{PULSE} = T_{MIN} + n \cdot T_\Delta, \qquad \text{(Equation 1)}$$

where $T_{MIN}$ is the predetermined minimum pulse length (i.e., approximately 500 μsec) and $T_\Delta$ is the predetermined increment (i.e., approximately 50 μsec), which defines how much longer each successive pulse time is as compared to the previous pulse time. The microprocessor 230 initializes the pulse timer with the strike attempt period $T_{STK}$ and starts the pulse timer at step 348, and drives the strike control signal $V_{STK}$ high (i.e., to approximately the supply voltage $V_{CC}$) at step 350, before the fluorescent lamp control procedure 300 exits.

If the microprocessor 230 should end the present pulse (i.e., if the pulse timer is equal to approximately the difference between the strike attempt period $T_{STK}$ and the length $T_{PULSE}$ of the present pulse time) at step 352, the microprocessor drives the strike control signal $V_{STK}$ low to approximately circuit common at step 354 and increments the variable n at step 356, before the fluorescent lamp control procedure 300 exits. When the magnitude of the digitally-filtered lamp current $I_{LAMP-DF}$ becomes greater than or equal to the strike current threshold $I_{STK}$ at step 342 (i.e., either during a pulse or during the dead time between the pulse times), the microprocessor 230 changes to the on mode at step 358 and drives the clamp level control signal $V_{CLMP-LVL}$ high to approximately the supply voltage $V_{CC}$ at step 360. In addition, the microprocessor 230 drives the clamp enable control signal $V_{CLMP-EN}$ low to approximately circuit common at step 362, before the fluorescent lamp control procedure 300 exits. Accordingly, the clamp circuit 236 no longer limits the magnitude of the output control signal $V_{PI}$ of the PI controller 232, and the operating frequency $f_{OP}$ of the inverter circuit 145 will now be adjusted in response to the output control signal $V_{PI}$ to drive the lamp current $I_{LAMP}$ to be equal to the target lamp current $I_{TARGET}$.

Figure 9:
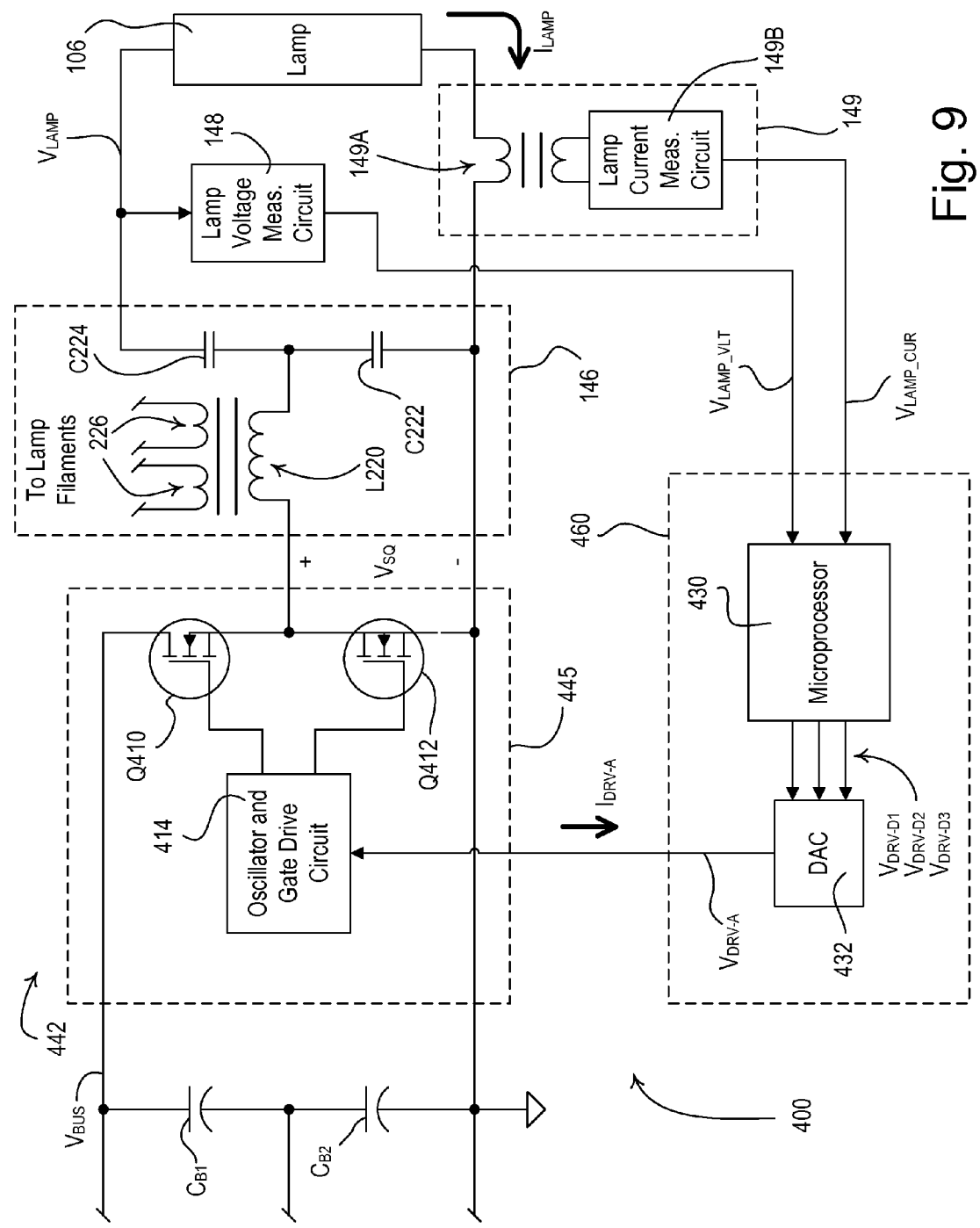
FIG. 9 is a simplified schematic diagram showing a portion of a hybrid light source according to a second embodiment of the present invention.
Figure 10:
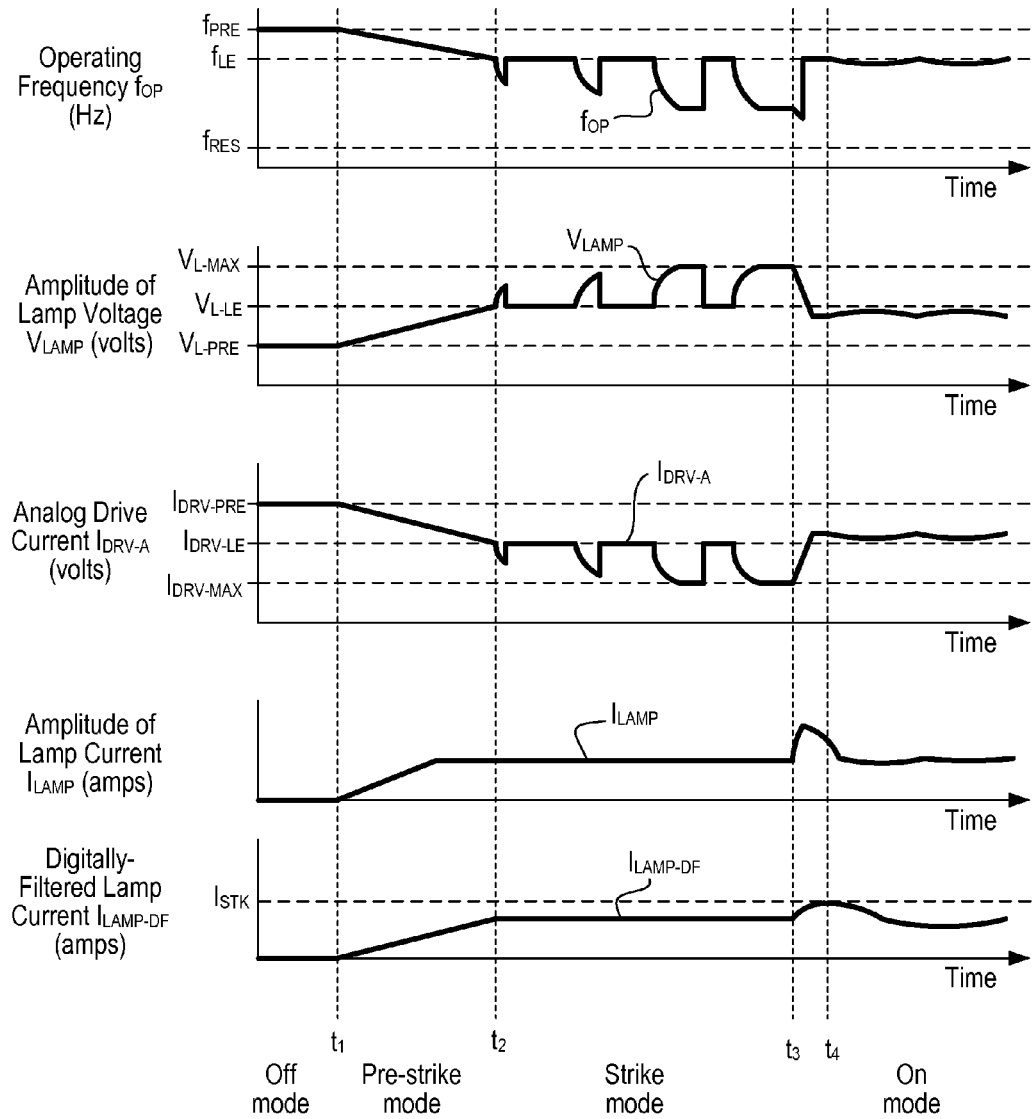
FIG. 10 shows example waveforms that illustrate the operation of the hybrid light source of FIG. 9.

FIG. 9 is a simplified schematic diagram of a portion of a hybrid light source 400 according to a second embodiment of the present invention. FIG. 10 shows example waveforms that illustrate the operation of the hybrid light source 400 of the second embodiment. The hybrid light source 400 comprises a dimmable ballast circuit 442 having an inverter circuit 445, which includes two FETs Q410, Q412 that operate to convert the DC bus voltage $V_{BUS}$ to the high-frequency square-wave voltage $V_{SQ}$ (as in the first embodiment). The inverter circuit 445 comprises a combined oscillator and gate drive circuit 414 for driving the FETs Q410, Q412. The oscillator and gate drive circuit 414 may comprise, for example, an integrated circuit (not shown), such as part number L6591, manufactured by ST Microelectronics.

The hybrid light source 400 further comprises a control circuit 460 having a microprocessor 430 that is operatively coupled to the oscillator and gate drive circuit 414 through a digital-to-analog converter (DAC) circuit 432. The DAC circuit 432 may comprise a resistor DAC that outputs an analog drive signal $V_{DRV-A}$ in response to three digital drive signals $V_{DRV-D1}$, $V_{DRV-D2}$, $V_{DRV-D3}$ generated by the microprocessor 430. Specifically, the DAC circuit 432 sinks an analog drive current $I_{DRV-A}$ through the oscillator and gate drive circuit 414. The oscillator and gate drive circuit 414 controls the operating frequency $f_{OP}$ of the high-frequency square-wave voltage $V_{SQ}$ in response to the magnitude of the analog drive current $I_{DRV-A}$. For example, the operating frequency $f_{OP}$ of the high-frequency square-wave voltage $V_{SQ}$ may be proportional to the magnitude of the analog drive current $I_{DRV-A}$ as shown in FIG. 10. The microprocessor 430 is operable to pulse-width modulate the digital drive signals $V_{DRV-D1}$, $V_{DRV-D2}$, $V_{DRV-D3}$, such that the magnitude of the analog drive signal $V_{DRV-A}$ (and thus the magnitude of the analog drive current $I_{DRV-A}$) is dependent upon the duty cycles of the digital drive signals $V_{DRV-D1}$, $V_{DRV-D2}$, $V_{DRV-D3}$. Alternatively, the DAC circuit 432 could comprise a high-speed DAC integrated circuit (IC) operable to be coupled to the microcontroller 430 via a digital communication bus, e.g., a serial peripheral interface (SPI) bus or an inter-integrated circuit (I²C), for adjusting the magnitude of the analog drive signal $V_{DRV-A}$.

Figure 11A:
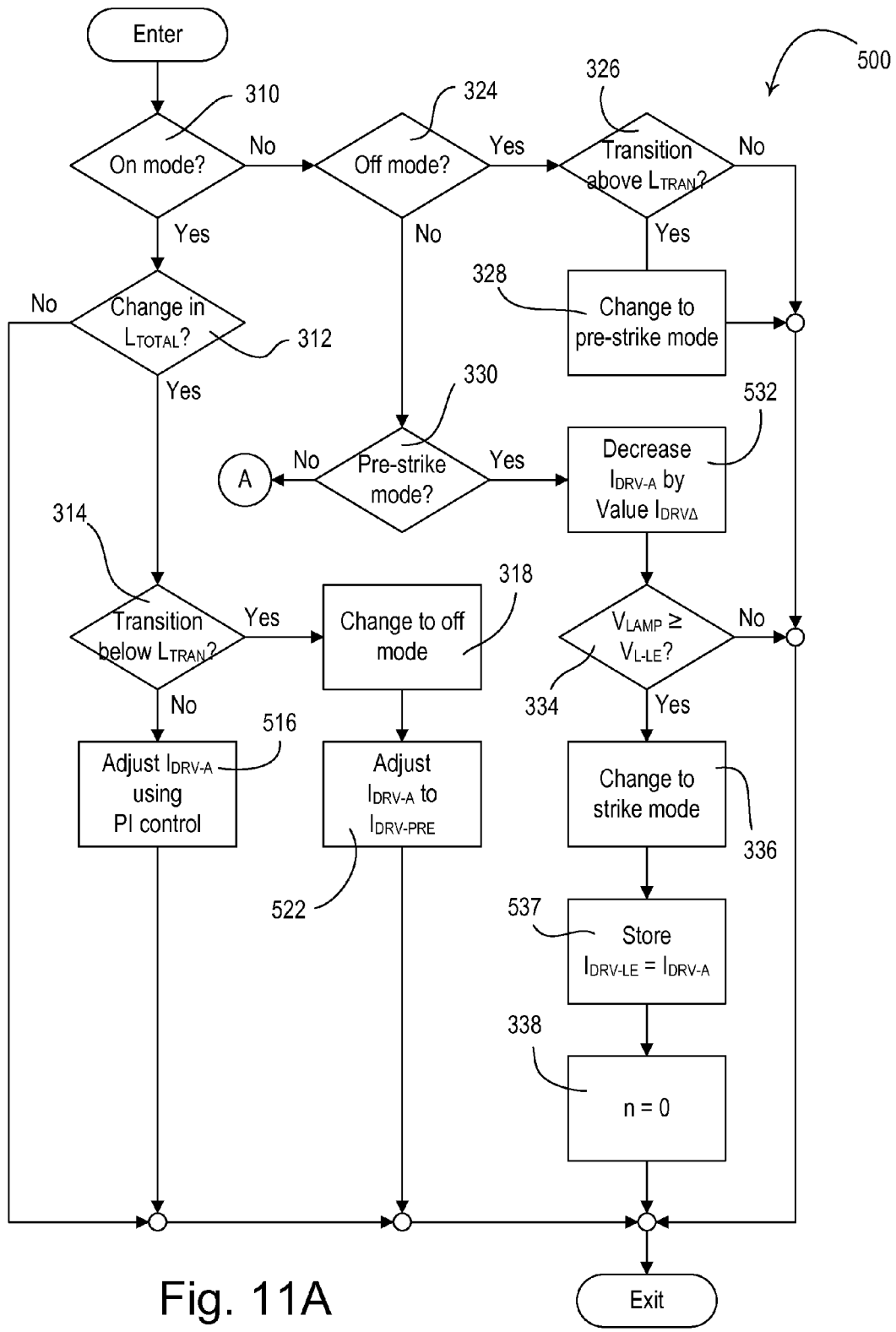
FIGS. 11A and 11B are simplified flowcharts of a fluorescent lamp control procedure executed periodically by a microprocessor of the hybrid light source of FIG. 9 according to the first embodiment of the present invention.
Figure 11B:
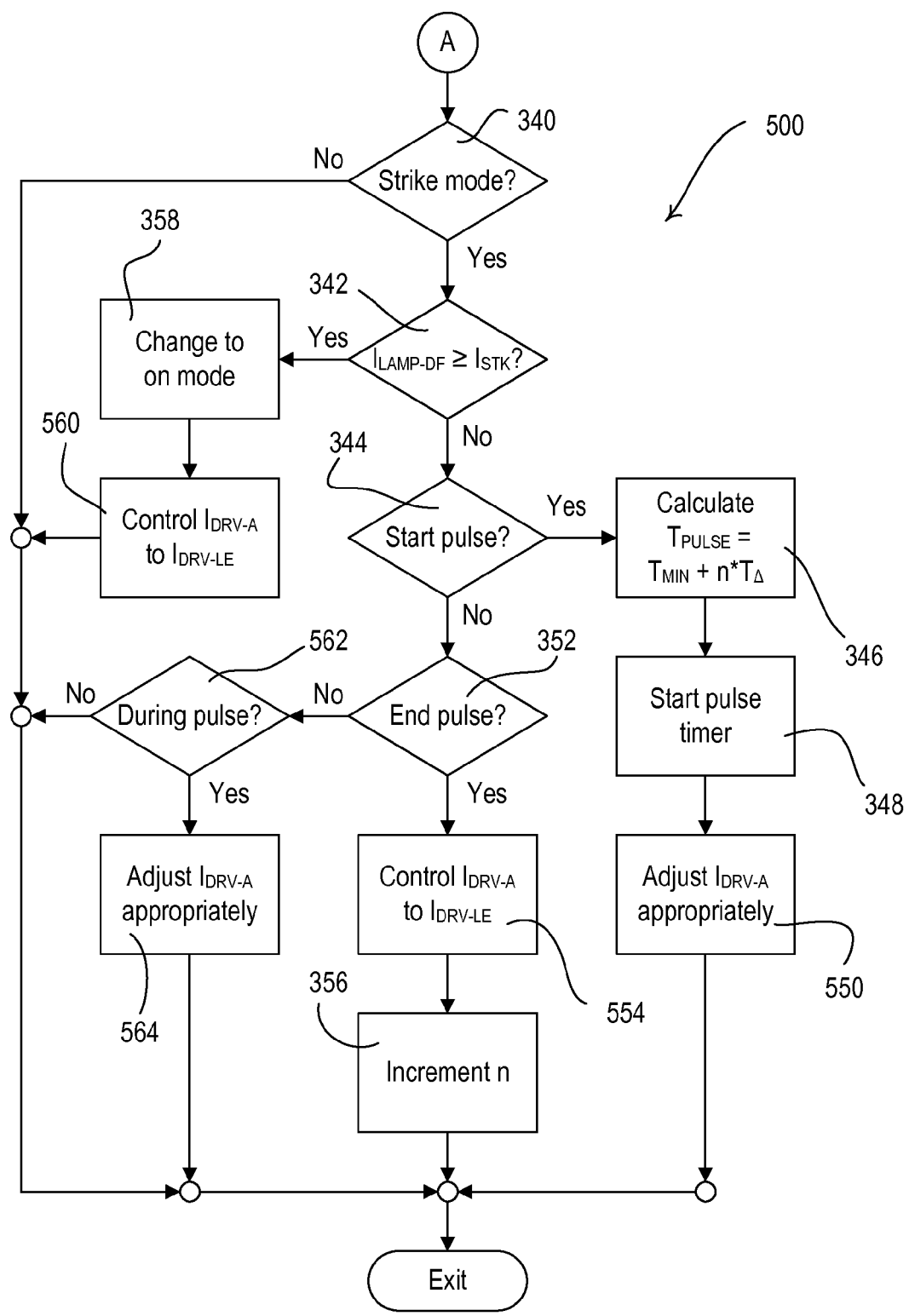

FIGS. 11A and 11B are simplified flowcharts of a fluorescent lamp control procedure 500 executed periodically (e.g., every 100 μsec) by the microprocessor 430 of the control circuit 460 according to the second embodiment of the present invention. The fluorescent lamp control procedure 500 of the second embodiment is very similar to the fluorescent lamp control procedure 300 of the first embodiment. However, rather than controlling the operating frequency $f_{OP}$ via the clamp enable control signal $V_{CLMP-EN}$, the clamp level control signal $V_{CLMP-LVL}$, and the target control signal $V_{TARGET}$, the microprocessor 430 of the second embodiment controls the magnitude of the analog drive current $I_{DRV-A}$ to adjust the operating frequency $f_{OP}$ of the inverter circuit 445 (which is proportional to the magnitude of the analog drive current $I_{DRV-A}$). In addition, the microprocessor 230 executes a PI control loop to minimize the error between the target lamp current $I_{TARGET}$ for the fluorescent lamp 106 and the present amplitude of the lamp current $I_{LAMP}$.

Particularly, when a change in the desired total lighting intensity $L_{DESIRED}$ during does not cause the fluorescent lamp 106 to be turned off at step 314, the microprocessor 430 adjusts the magnitude of the analog drive current $I_{DRV-A}$ using the PI control loop at step 516. When a change in the desired total lighting intensity $L_{DESIRED}$ takes the desired total lighting intensity $L_{DESIRED}$ below the transition intensity $L_{TRAN}$ at step 314, the microprocessor 430 adjusts the magnitude of the analog drive current $I_{DRV-A}$ to a preheat drive current $I_{DRV-PRE}$ at step 522, which causes the operating frequency $f_{OP}$ to be controlled to the preheat frequency $f_{PRE}$. During the pre-strike mode, the microprocessor 430 decreases the magnitude of the analog drive current $I_{DRV-A}$ by a predetermined value $I_{DRV\Delta}$ at step 532, such that the operating frequency $f_{OP}$ will decrease and the lamp voltage $V_{LAMP}$ will increase. As the microprocessor 430 continues to periodically execute the fluorescent lamp control procedure 500 while in the pre-strike mode, the microprocessor will continue to decreases the magnitude of the analog drive current $I_{DRV-A}$ by the predetermined value $I_{DRV\Delta}$ at step 532. In addition, after changing to the strike mode at step 336, the microprocessor 430 stores the present magnitude of the analog drive current $I_{DRV-A}$ as a low-end drive current $I_{DRV-LE}$ at step 537. For example, the microprocessor 430 may store the duty cycles of the digital drive signals $V_{DRV-D1}$, $V_{DRV-D2}$, $V_{DRV-D3}$ at step 537.

Referring to FIG. 11B, when the microprocessor 430 is in the strike mode and should either begin a new pulse time at step 344 or continue a present pulse time at step 562, the microprocessor 340 adjusts the magnitude of the analog drive current $I_{DRV-A}$ appropriately at steps 550, 564 to generate the predetermined (e.g., exponential) slope in the analog drive current $I_{DRV-A}$ so as to control the amplitude of the lamp voltage $V_{LAMP}$ to the maximum lamp voltage $V_{L-MAX}$ as shown in FIG. 10. When the microprocessor 430 should end the present pulse time at step 352, the microprocessor adjusts the analog drive current $I_{DRV-A}$ at step 554 to the low-end drive current $I_{DRV-LE}$ (as stored in step 537). When the magnitude of the digitally-filtered lamp current $I_{LAMP-DF}$ becomes greater than or equal to the strike current threshold $I_{STK}$ at step 342, the microprocessor 430 changes to the on mode at step 358 and adjusts the analog drive current $I_{DRV-A}$ at step 560 to the low-end drive current $I_{DRV-LE}$ (as stored in step 537), before the fluorescent lamp control procedure 500 exits. When in the on mode, the microprocessor 430 will once again adjust the magnitude of the analog drive current $I_{DRV-A}$ using the PI control loop (at step 516).

While the present invention has been described with reference to the hybrid light source 100, the method of striking a fluorescent lamp of the present invention could be used in any dimmable electrical ballast to minimize flickering, flashing, and brightness overshooting of the intensity of the lamp when turning the lamp on near low-end.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of striking a gas discharge lamp comprising the steps of:
    generating a high-frequency square-wave voltage having an operating frequency;
    generating a sinusoidal voltage from the high-frequency square-wave voltage;
    coupling the sinusoidal voltage to the lamp;
    controlling the amplitude of the sinusoidal voltage to a low-end amplitude; and
    periodically increasing the amplitude of the sinusoidal voltage above the low-end amplitude during successive pulse times and then decreasing the amplitude of the sinusoidal voltage towards the low-end amplitude at the end of each of the successive pulse times, the length of each of the successive pulse times being greater than the length of the previous pulse time, until the lamp has struck.

2. The method of claim 1, wherein the amplitude of the sinusoidal voltage is dependent upon the operating frequency of the high-frequency square-wave voltage, and controlling the amplitude of the sinusoidal voltage to a low-end amplitude further comprises controlling the operating frequency of the square-wave voltage to a low-end frequency.

3. The method of claim 2, wherein increasing the amplitude of the sinusoidal voltage during successive pulse times further comprises decreasing the operating frequency below the low-end frequency to increase the amplitude of the lamp voltage above the low-end amplitude during each pulse time.

4. The method of claim 3, wherein decreasing the amplitude of the sinusoidal voltage at the end of each of the successive pulse times further comprises increasing the operating frequency back to the low-end frequency to decrease the amplitude of the lamp voltage back to the low-end amplitude at the end of each pulse time.

5. The method of claim 4, further comprising:
    generating a lamp current control signal representative of an amplitude of a lamp current conducted through the lamp; and
    determining whether the lamp has struck in response to the amplitude of the lamp current.

6. The method of claim 5, further comprising:
    controlling the amplitude of the lamp voltage to the low-end amplitude in response to determining that the lamp has struck.

7. The method of claim 5, further comprising:
    filtering the lamp current control signal to generate a filtered lamp current control signal;
    wherein determining whether the lamp has struck further comprises determining whether the magnitude of the filtered lamp current exceeds a strike current threshold.

8. The method of claim 1, wherein the length of a first one of the pulse times is equal to a minimum pulse length, and the length of each of the subsequent successive pulse times is a predetermined increment longer than the previous pulse time.

9. The method of claim 8, wherein a constant strike period exists between the beginning of each of the successive pulse times.

10. The method of claim 1, wherein the amplitude of the sinusoidal voltage during each of the successive pulse times increases with respect to time across the length of the pulse time.

11. The method of claim 10, wherein the amplitude of the sinusoidal voltage during each of the successive pulse times increases exponentially with respect to time across the length of the pulse time.

12. The method of claim 1, wherein a maximum amplitude of the sinusoidal voltage during each pulse time is greater than a maximum amplitude of the sinusoidal voltage during the previous pulse time.

13. An electronic ballast for driving a gas discharge lamp, the ballast comprising:
an inverter circuit for receiving a DC bus voltage and for generating a high-frequency square-wave voltage having an operating frequency;
a resonant tank circuit for receiving the high-frequency square-wave voltage and generating a sinusoidal voltage for driving the lamp; and
a control circuit coupled to the inverter circuit for controlling the amplitude of the sinusoidal voltage;
wherein the control circuit is adapted to cause the lamp to strike by controlling the amplitude of the sinusoidal voltage to a low-end amplitude, the control circuit adapted to periodically increase the amplitude of the sinusoidal voltage during successive pulse times and to decrease the amplitude of the sinusoidal voltage towards the low-end amplitude at the end of each of the successive pulse times, the length of each of the successive pulse times being greater than the length of the previous pulse time, until the lamp has struck.

14. The ballast of claim 13, wherein the amplitude of the sinusoidal voltage is dependent upon the operating frequency of the high-frequency square-wave voltage, the control circuit operable to control the operating frequency to a low-end frequency to control the amplitude of the sinusoidal voltage to the low-end amplitude.

15. The ballast of claim 14, wherein the control circuit decreases the operating frequency below the low-end frequency to increase the amplitude of the sinusoidal voltage above the low-end amplitude during each pulse time.

16. The ballast of claim 15, wherein the control circuit comprises a microprocessor.

17. The ballast of claim 16, wherein the microprocessor is adapted to receive a lamp current control signal representative of a present amplitude of a lamp current conducted through the lamp, and to determine whether the lamp has struck.

18. The ballast of claim 17, wherein the microprocessor is adapted to digitally filter the lamp current control signal to generate a filtered lamp current control signal, and determine whether the lamp has struck in response to the magnitude of the filtered lamp current exceeding a strike current threshold.

19. The ballast of claim 18, wherein the microprocessor is adapted to increase the operating frequency back to the low-end frequency at the end of each pulse time to decrease the amplitude of the sinusoidal voltage back to the low-end amplitude.

20. The ballast of claim 18, wherein the microprocessor is adapted to control the amplitude of the lamp voltage to the low-end amplitude in response to determining that the lamp has struck.

21. The ballast of claim 17, wherein the control circuit comprises:
a proportional-integral controller operable to provide an output control signal to the inverter circuit for adjusting the operating frequency of the square-wave voltage to minimize the difference between the present amplitude of the lamp current and a target lamp current;
a clamp circuit operable to clamp the output control signal of the PI controller, such that the operating frequency of the square-wave voltage is controlled to the low-end frequency while the control circuit is attempting to strike the lamp; and
a strike control circuit coupled to the inverter circuit and operable to decrease the operating frequency below the low-end frequency to increase the amplitude of the sinusoidal voltage above the low-end amplitude during each successive pulse time of the sinusoidal voltage while the control circuit is attempting to strike the lamp.

22. The ballast of claim 17, wherein the microprocessor is operatively coupled to the inverter circuit for adjusting the operating frequency of the square-wave voltage, the microprocessor operable to execute a proportional-integral control loop to minimize the difference between the present amplitude of the lamp current and a target lamp current, the microprocessor operable to control the operating frequency to the low-end frequency and then decrease the operating frequency below the low-end frequency to increase the amplitude of the sinusoidal voltage during the successive pulse times while attempting to strike the lamp.

23. The ballast of claim 13, wherein the length of a first one of the pulse times is equal to a minimum pulse length, and the length of each of the subsequent successive pulse times is a predetermined increment longer than the previous pulse time.

24. The ballast of claim 23, wherein a constant strike period exists between the beginning of each of the successive pulse times.

25. The ballast of claim 13, wherein the amplitude of the sinusoidal voltage during each of the successive pulse times increases with respect to time across the length of the pulse time.

26. The ballast of claim 25, wherein the amplitude of the sinusoidal voltage during each of the successive pulse times increases exponentially with respect to time across the length of the pulse time.

27. The ballast of claim 13, wherein a maximum amplitude of the sinusoidal voltage during each pulse time is greater than a maximum amplitude of the sinusoidal voltage during the previous pulse time.

28. A hybrid light source adapted to receive power from an AC power source and to produce a total light intensity, the total light intensity controlled throughout a dimming range from a low-end intensity and high-end intensity, the hybrid light source comprising:
a continuous-spectrum light source circuit having a continuous-spectrum lamp;
a discrete-spectrum light source circuit having a gas-discharge lamp and an electronic ballast circuit for driving the gas-discharge lamp, the ballast circuit comprising an inverter circuit for generating a high-frequency square-wave voltage having an operating frequency, and a resonant tank circuit for receiving the high-frequency square-wave voltage and generating a sinusoidal voltage for driving the lamp; and
a control circuit coupled to both the continuous-spectrum light source circuit and the discrete-spectrum light source circuit for individually controlling the amount of power delivered to each of the continuous-spectrum lamp and the gas-discharge lamp, such that the total light intensity of the hybrid light source is controlled to a target intensity, the control circuit operable to turn off the gas-discharge lamp and control only the continuous-spectrum lamp to be illuminated when the target intensity is below the transition intensity, the control circuit operable to illuminate both the continuous-spectrum lamp and the gas-discharge lamp when the target intensity is above the transition intensity;

wherein when the target intensity transitions from below to above the transition intensity, the control circuit is adapted to cause the gas-discharge lamp to strike by controlling the amplitude of the sinusoidal voltage to a low-end amplitude, and then periodically increasing the amplitude of the sinusoidal voltage during successive pulse times and decreasing the amplitude of the sinusoidal voltage towards the low-end amplitude at the end of each of the successive pulse times, the length of each of the successive pulse times being greater than the length of the previous pulse time, until the lamp has struck.

29. The light source of claim 28, wherein the amplitude of the sinusoidal voltage during each of the successive pulse times increases with respect to time at a predetermined rate across the length of the pulse time.

30. The light source of claim 28, wherein a maximum amplitude of the sinusoidal voltage during each pulse time is greater than a maximum amplitude of the sinusoidal voltage during the previous pulse time.

* * * * *